(12) United States Patent
Meitav et al.

(10) Patent No.: US 12,165,334 B2
(45) Date of Patent: Dec. 10, 2024

(54) SYSTEMS AND METHODS FOR DYNAMIC IMAGE PROCESSING AND SEGMENTATION

(71) Applicant: Meta Platforms Technologies, LLC, Menlo Park, CA (US)

(72) Inventors: Ohad Meitav, Sunnyvale, CA (US); Vlad Fruchter, Los Altos, CA (US); Jeremy Snodgrass, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 550 days.

(21) Appl. No.: 17/393,636

(22) Filed: Aug. 4, 2021

(65) Prior Publication Data

US 2022/0319014 A1 Oct. 6, 2022

Related U.S. Application Data

(60) Provisional application No. 63/170,717, filed on Apr. 5, 2021.

(51) Int. Cl.
*G06T 7/215* (2017.01)
*G02B 27/00* (2006.01)
(Continued)

(52) U.S. Cl.
CPC .......... *G06T 7/215* (2017.01); *G02B 27/0093* (2013.01); *G02B 27/017* (2013.01);
(Continued)

(58) Field of Classification Search
CPC .......... G06F 3/013; G06F 3/011; G06F 3/012; G06F 1/163; G06F 3/14; G06F 3/16; G06T 19/006; G06T 2207/10016; G06T 7/70; G06T 19/00; G06T 3/4053; G06T 7/20; G02B 27/017; G02B 27/0172; G02B 27/0093; G02B 2027/014; G02B 2027/0178; G02B 2027/0138;
(Continued)

(56) References Cited

U.S. PATENT DOCUMENTS 10,448,189 B2 * 10/2019 Link .................. G02B 27/0093
10,743,127 B2 * 8/2020 Mate ...................... H04S 3/008
(Continued)

OTHER PUBLICATIONS

International Search Report and Written Opinion for International Application No. PCT/US2022/023194, mailed Aug. 5, 2022, 14 pages.

*Primary Examiner* — Aaron W Carter
*Assistant Examiner* — Courtney Joan Nelson
(74) *Attorney, Agent, or Firm* — Foley & Lardner LLP

(57) ABSTRACT

A method for obtaining multiple frames of image data includes obtaining a first frame of image data of an entirety of a field of view by a camera sensor. The method also includes defining one or more regions of the field of view using the first frame of image data. The method includes determining at least one of a frame rate and an image capture resolution for each of the one or more regions. The method includes operating the camera sensor to obtain partial frames of image data by obtaining image data of the one or more regions of the field of view according to at least one of the frame rate and the image capture resolution, and re-constructing one or more full frames from partial frames of image data.

20 Claims, 15 Drawing Sheets

(51) Int. Cl.
*G02B 27/01* (2006.01)
*G06T 7/11* (2017.01)
*G06T 7/194* (2017.01)
*G06V 10/25* (2022.01)

(52) U.S. Cl.
CPC ............... *G06T 7/11* (2017.01); *G06T 7/194* (2017.01); *G06V 10/25* (2022.01); *G02B 2027/0123* (2013.01); *G02B 2027/0138* (2013.01); *G02B 2027/014* (2013.01)

(58) Field of Classification Search
CPC ............ G02B 27/01; G02B 2027/0147; G02B 2027/0123; G02B 6/0073; H04N 21/816; H04N 13/344; H04N 23/698; H04N 19/167; H04N 19/172; H04N 21/4728; H04N 13/383; H04N 19/17; G09G 2340/0407; G09G 2330/021; G09G 5/391; G09G 2340/04
See application file for complete search history.

(56) References Cited

U.S. PATENT DOCUMENTS

| | | | |
|---|---|---|---|
| 10,986,270 B2 * | 4/2021 | Smith | H04N 13/344 |
| 2017/0336863 A1 * | 11/2017 | Tilton | G06F 3/011 |
| 2018/0307305 A1 * | 10/2018 | Babu | G02B 27/017 |
| 2019/0050664 A1 * | 2/2019 | Yang | G06F 3/011 |
| 2019/0068529 A1 * | 2/2019 | Mullins | G06T 19/006 |
| 2020/0180519 A1 | 6/2020 | Mori | |

* cited by examiner

SYSTEMS AND METHODS FOR DYNAMIC IMAGE PROCESSING AND SEGMENTATION

CROSS-REFERENCE TO RELATED PATENT APPLICATION

This application claims the benefit of and priority to U.S. Provisional Patent Application No. 63/170,717, filed Apr. 5, 2021, the entire disclosure of which is incorporated by reference herein.

FIELD OF THE DISCLOSURE

The present disclosure relates generally to video or display systems. More particularly, the present disclosure relates to systems and methods for capturing or processing image data.

BACKGROUND

The present disclosure relates generally to video, augmented reality (AR), mixed reality (MR) and/or virtual reality (VR) systems. Video, AR, MR, and VR systems can be used to present various images, including three-dimensional (3D) images, to a user. For example, video, AR, MR or VR headsets can be used to present images to the user in a manner that is overlaid on a view of a real world environment or that simulates a virtual environment.

SUMMARY

One implementation of the present disclosure is a method for obtaining multiple frames of image data, according to some embodiments. In some embodiments, the method includes obtaining a first frame of image data of a field of view by a camera sensor. In some embodiments, the method includes defining one or more regions of the field of view using the first frame of image data. In some embodiments, the method includes determining at least one of a frame rate and an image capture resolution for each of the one or more regions. In some embodiments, the method includes obtaining partial frames of the image data by obtaining the image data of the one or more regions of the field of view according to at least one of the frame rate and the image capture resolution.

In some embodiments, the first frame is a full frame of an entirety of the field of view. In some embodiments, obtaining the frame of image data includes obtaining two or more frames of image data. In some embodiments, defining the one or more regions of the field of view includes comparing the two or more frames to each other to identify multiple areas of motion. In some embodiments, the method includes defining multiple regions, each region associated with a different one of the areas of motion.

In some embodiments, areas of motion include at least a first area and a second area. In some embodiments, an amount of motion present at the first area is greater than an amount of motion present at the second area.

In some embodiments, obtaining the partial frames of the image data includes operating the camera sensor to obtain the partial frames of image data according to at least one of the frame rate and the image capture resolution. In some embodiments, obtaining the partial frames of the image data includes operating the camera sensor to obtain full frames at a full resolution and a maximum frame rate, and obtaining the partial frames of image data according to at least one of the frame rate and the image capture resolution based on the full frames using an image signal processor or a sensor readout circuit.

In some embodiments, obtaining the frame of image data includes obtaining two or more frames of image data. In some embodiments, defining the one or more regions of the field of view includes performing depth estimation based on the image data of the two or more frames of image data, determining a foreground and a background of an environment based on the depth estimation, and defining a first region associated with the foreground and a second region associated with the background.

In some embodiments, defining the one or more regions of the field of view includes performing depth estimation to identify at least a foreground and a background of an environment, and defining a first region associated with the foreground and a second region associated with the background.

In some embodiments, the frame rate for the first region is greater than the frame rate for the second region.

In some embodiments, defining the one or more regions of the field of view includes detecting one or more objects in field of view based on the frame of image data. In some embodiments, the method includes defining a region for each of the one or more objects in the field of view.

In some embodiments, the method further includes obtaining sensor data indicating a direction and magnitude of motion of a user's head. In some embodiments, the method includes defining the one or more regions at least partially based on at least one of the direction or magnitude of motion of the user's head.

In some embodiments, the method further includes constructing one or more frames using the partial frames of image data.

Another implementation of the present disclosure is a system including a head wearable display and processing circuitry, according to some embodiments. In some embodiments, the head wearable display includes a camera sensor, and at least one of an inertial measurement unit (IMU), a visual inertial odometry (VIO) sensor, or a depth sensor. In some embodiments, the processing circuitry is configured to obtain a first frame of image data of a field of view from the camera sensor. In some embodiments, the processing circuitry is configured to define one or more regions of the field of view using the first frame of image data. In some embodiments, the processing circuitry is configured to determine at least one of a frame rate and an image capture resolution for each of the one or more regions. In some embodiments, the processing circuitry is configured to operate the camera sensor to obtain partial frames of image data by obtaining the image data of the one or more regions of the field of view according to at least one of the frame rate and the image capture resolution.

In some embodiments, the processing circuitry includes both local processing circuitry positioned at the head wearable display, and remote processing circuitry positioned remotely from the head wearable display.

In some embodiments, the remote processing circuitry is processing circuitry of a user's personal computing device.

In some embodiments, the head wearable display further includes a battery. In some embodiments, the battery is configured to provide electrical power to any of the processing circuitry, the camera sensor, the IMU, or the VIO sensor. In some embodiments, defining the one or more regions, determining at least one of the frame rate or the image capture resolution, and operating the camera sensor to obtain the partial frames reduces power consumption from the battery by a factor.

In some embodiments, the factor is a function of a number of the one or more regions, frame rates of each of the one or more regions, resolutions of each of the one or more regions, a nominal frame rate, and a nominal resolution.

In some embodiments, the system further includes at least one of light emitting diodes (LEDs) or a speaker. In some embodiments, the processing circuitry is configured to track a relative position of one of the one or more regions relative to a periphery of the field of view of the camera sensor. In some embodiments, the processing circuity is also configured to operate at least one of the LEDs or the speaker in response to the one of the one or more regions approaching the periphery of the field of view of the camera sensor to inform the user regarding the periphery of the field of view of the camera sensor.

In some embodiments, the LEDs are positioned along a frame of the head wearable display.

Another implementation of the present disclosure is a method for obtaining frames of image data, according to some embodiments. In some embodiments, the method includes obtaining spatial audio from a spatial audio sensor. In some embodiments, the method includes defining one or more regions of a field of view of a camera sensor based on the spatial audio. In some embodiments, the method includes determining a frame rate for each of the one or more regions of the field of view of the camera sensor. In some embodiments, the method includes operating the camera sensor to obtain partial frames of each of the one or more regions according to the frame rate for each of the one or more regions.

In some embodiments, the method further includes constructing one or more frames using the partial frames of image data.

In some embodiments, the spatial audio sensor includes an array of microphones.

In some embodiments, at least one of the one or more regions are centered at a spatial audio source.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Overview

Referring generally to the FIGURES, systems and methods for performing dynamic image segmentation for a head wearable device are shown, according to some embodiments. The dynamic image segmentation can be performed based on environmental motion as detected in obtained frames or image data, head motion, depth detection, subject or object detection, spatial audio, or any combination thereof. The regions can be assigned different frame rates and/or different image capture qualities. Image signal processing can be performed remotely from the head wearable device to facilitate reduced power consumption of an onboard battery of the head wearable device. Advantageously, regions of lower interest can be obtained at a reduced frame rate and/or a reduced image quality to facilitate improved power consumption and head dissipation of the head wearable device.

Image Capture System

Figure 1:
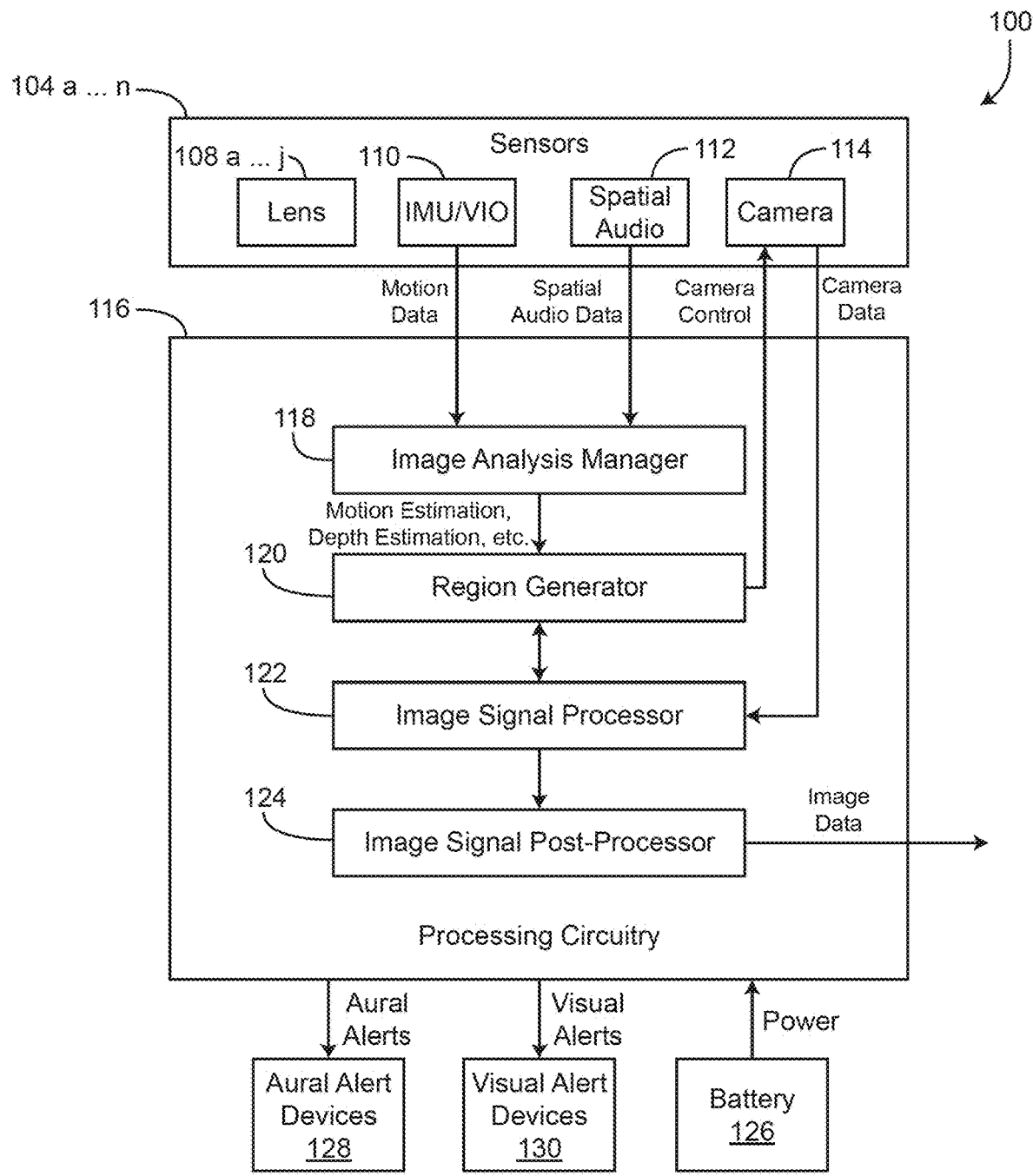
FIG. 1 is a block diagram of a display and image processing system, according to some embodiments.

Referring particularly to FIG. 1, an image processing system 100 is shown, according to some embodiments. In some embodiments, image processing system 100 includes the same or similar components (configured as described herein) to the components of system 100 as described in U.S. application Ser. No. 16/818,750, filed Mar. 13, 2020, the entire disclosure of which is incorporated by reference herein. The image processing system 100 can be implemented using a head mounted display (HMD) system, a head wearable display (HWD) system, a virtual reality (VR) system, an augmented reality (AR) system, etc.

Sensors $104a \ldots n$ (generally referred herein as sensors 104) can include any type of one or more cameras. The cameras can be visible light cameras (e.g., color or black and white), infrared cameras, or combinations thereof. Sensors $104a \ldots n$ can each include one or more lenses $108\ a \ldots j$ generally referred herein as lens 108). In some embodiments, sensor 104 can include a camera for each lens 108. In some embodiments, sensor 104 include a single camera with multiple lenses $108\ a \ldots j$. In some embodiments, sensor 104 can include multiple cameras, each with multiple lenses 108. The one or more cameras of sensor 104 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing calibration techniques described herein.

The one or more cameras of sensor 104 and lens 108 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

System 100 can include a first sensor (e.g., image capture device) 104a or a collection of sensors 104a n that include(s) a first lens 108a, first sensor 104a arranged to capture a first image 112a of a first view, and a second sensor 104b that includes a second lens 108b, second sensor 104b arranged to capture a second image 112b of a second view. The first view and the second view may correspond to different perspectives, enabling depth information to be extracted from a first image and a second image. For example, the first view may correspond to a left eye view, and the second view may correspond to a right eye view. System 100 can include a third sensor 104c that includes a third lens 108c, third sensor 104c arranged to capture a third image of a third view. The third view may correspond to a top view that is spaced from an axis between first lens 108a and second lens 108b, which can enable system 100 to more effectively handle depth information that may be difficult to address with first sensor 104a and second sensor 104b, such as edges (e.g., an edge of a table) that are substantially parallel to the axis between first lens 108a and second lens 108b.

Light of an image to be captured by sensors $104a \ldots n$ can be received through the one or more lenses $108\ a \ldots j$. Sensors $104a \ldots n$ can include sensor circuitry, including but not limited to charge-coupled device (CCD) or complementary metal-oxide-semiconductor (CMOS) circuitry, which can detect the light received via the one or more lenses $108a \ldots j$ and generate images based on the received light. For example, sensors $104a \ldots n$ can use the sensor circuitry to generate first image corresponding to the first view and second image corresponding to the second view. The one or more sensors $104a \ldots n$ can provide images to processing circuitry 116. The one or more sensors $104a \ldots n$ can provide images with a corresponding timestamp, which can facilitate synchronization of images when image processing is executed on images, such as to identify particular first and second images representing first and second views and having the same timestamp that should be compared to one another to calculate gaze information.

The sensors $104a \ldots n$ can include the lenses $108a \ldots j$, one or more inertial measurement units (IMU) or visual inertial odometry (VIO) sensors, shown as IMU/VIO 110, a spatial audio device 112 (e.g., a microphone), and one or more point-of-view cameras (e.g., video cameras, image capture devices, etc.) for capturing pictures or videos, shown as camera 114. In some embodiments, the sensors 104 include a depth sensor that is separate from the camera 114 or the lenses 108 (e.g., a depth sensor that operates based on time of flight (TOF), LIDAR, ultrasound, ultra-wideband (UWB), etc.). In some embodiments, the depth sensor is configured to measure a distance or depth between the HWD and the different areas in an environment surrounding the HWD. The image processing system 100 can be an AR and/or video capture device that is wearable by a user the camera 114 for capturing pictures or videos. Camera 114 can be the same as or similar to lenses $108a \ldots j$. The image processing system 100 also includes processing circuitry 116.

In some embodiments, the image processing system 100 is configured to perform the functionality described herein on processing circuitry 116. Processing circuitry 116 can include one or more distributed processors (e.g., a processor or processing circuitry locally positioned on a head wearable and/or AR device, and a processor or processing circuitry on a remote device such as a user's personal computer device, a smartphone, data center, cloud computing system, etc.).

At least some of processing circuitry 116 can be implemented using a graphics processing unit (GPU). The functions of processing circuitry 116 can be executed in a distributed manner using a plurality of processing units.

Processing circuitry 116 may include one or more circuits, processors, and/or hardware components. Processing circuitry 116 may implement any logic, functions or instructions to perform any of the operations described herein. Processing circuitry 116 can include any type and form of executable instructions executable by any of the circuits, processors or hardware components. The executable instructions may be of any type including applications, programs, services, tasks, scripts, libraries processes and/or firmware.

In some embodiments, the processing circuitry 116 includes an image analysis manager 118, a region generator 120, an image signal processor (ISP) 122, and an ISP post-processor 124. In some embodiments, the ISP 122 is performed on the AR and/or wearable device. In some embodiments, the ISP post-processor 124 is performed on the remote device. In some embodiments, the image analysis manager 118, and the region generator 120 are performed on the AR and/or wearable device, or on the remote device.

Any of image analysis manager 118, region generator 120, image signal processor, 122, and/or image signal post-processor 124 may be any combination or arrangement of circuitry and executable instructions to perform their respective functions and operations. At least some portions of processing circuitry 116 can be used to implement image processing executed by sensors 104.

The image processing system 100 that is implemented on or is the AR or wearable device uses a battery 126, according to some embodiments. In some embodiments, the camera 114 is a main consumer of energy stored in the battery 126. An amount of power consumed by the camera 114 is proportional to a video frame rate and resolution of captured camera or video data obtained by the camera 114, according to some embodiments. Advantageously, the systems and methods described herein provide optimized power consumption techniques by segmenting image data, adjusting frame rate, adjusting image resolution, and obtaining image data at different resolutions for different segments or regions of interest (ROIs). In some embodiments, the ROIs are updated or adjusted dynamically. In some embodiments, the ROIs are updated or adjusted according to different modes. For example, in a first mode, the ROIs are not adjusted or updated in order to reduce power consumption associated with updating or adjusting the ROIs. In another mode, an update rate of the ROIs (e.g., how often the ROIs are updated or adjusted) is adjustable.

In some embodiments, any of the partial frames as described herein are obtained by operating the camera 114 or the lenses 108 to obtain image data of the partial frames according to the various ROIs, regions, areas, etc. In some embodiments, the camera 114 and/or the lenses 108 are operated to obtain full frames of image data (e.g., at full resolution and/or at a maximum frame rate), and the ISP 122 or a sensor readout circuit is configured to obtain the partial frames of the image data according to the various ROIs, regions, areas, etc., based on the full frames of image data.

Image analysis manager 118 is configured to obtain motion data or orientation data from the IMU/VIO 110, according to some embodiments. In some embodiments, image analysis manager 118 is configured to perform a motion estimation and provide the motion estimation to the region generator 120. In some embodiments, the image analysis manager 118 is configured to perform depth estimation and/or to estimate a direction of sound arrival based on spatial audio data obtained from the spatial audio device 112. The image analysis manager 118 can provide any of the motion estimation, the depth estimation, etc., to the region generator 120. In some embodiments, the image analysis manager 118 is configured to perform an image analysis technique using a neural network, a machine learning technique, etc., to identify one or more different types of objects, audio sources, objects of interest, etc., present in a field of view of the camera 114 or the lenses 108.

The region generator 120 is configured to segment an image obtained by the camera 114 or in a field of view of the camera 114 into different ROIs based on their speed of motion between frames (e.g., consecutive frames). The region generator 120 can be the same as or similar to the tile generator of system 100 as described in U.S. application Ser. No. 16/818,750, but generates tiles or ROIs for video capture instead of for video display. The region generator 120 is configured to determine different regions or segments and operate the camera 114 to capture regions or segments of the image that have a faster speed at a higher resolution and/or frame rate, and regions or segments of the image that have a slower speed at a lower resolution and/or frame rate. The region generator 120 uses the motion estimation, the depth estimation, etc., or more generally, the output of the image analysis manager 118 to determine the different regions or segments of the image of the camera 114. For example, the region generator 120 can control capture of the image data by controlling frame-rate or cropping of the regions or segments of the camera 114. The region generator 120 operates the camera 114 to perform motion adaptive frame rate (FPS) capture and/or motion adaptive image quality capture for the different segments or regions of the image or the field of view of the camera 114. The image analysis manager 118 and the region generator 120 can also use VIO tracking data or depth data (e.g., provided by the depth sensor) of static objects (as indicated in the motion data provided by the IMU/VIO 110) to identify stationary or slow moving areas so that the region generator 120 can generate slow moving regions or segments where the camera 114 can be operated to obtain lower resolution and/or lower frame rate image or camera data. In some embodiments, the different regions are identified by the region generator 120 as slow, medium, or fast speed regions or segments. Each of the slow, medium, or fast speed regions or segments can have different associated frame rates for video capture and/or different resolutions. The image signal processor 122 can obtain camera or video or image data from the camera 114 and up-convert frame rates of different regions, and stich or combine different regions or segments into a single image.

The image analysis manager 118 and the region generator 120 can additionally define segments or regions for the image data or field of view of the camera 114 based on a location of point audio sources in an external environment. For example, the image analysis manager 118 can identify a location of a point audio source as determined using a multi-microphone array (e.g., a triangulation technique), shown as the spatial audio device 112. The region generator 120 may then determine or generate segments or regions proximate the location of the point audio source as higher speed or higher importance regions (resulting in video capture of this region with a higher frame rate and/or a higher resolution) and generate segments or regions surrounding the location of the point audio source as lower speed or lower importance regions (resulting in video capture of this region with a lower frame rate and/or a lower resolution). In some embodiments, the image analysis manager 118 and the region generator 120 are configured to use any of the techniques as performed by the tile generator of system 100 as described in U.S. application Ser. No. 16/818,750 to determine different fovea regions. However, the fovea regions can be determined based on any of (1) image speed, (2) audio point source, or (3) depth detection.

In some embodiments, a gaze direction or location of the user's eyes is used as a high area of interest for the video capture of the camera 114. In some embodiments, a subject is used as an area of interest for generation of the segments or regions. For example, even is a subject is not currently moving and therefore does not qualify for higher resolution or high frame rate capture, the subject may be the focal point of the video for capture by the camera 114 and can therefore be prioritized by generation of a region or segment positioned at the subject for increased resolution or frame rate capture relative to other regions of the image, especially since the subject may be more likely to move than other areas of the image. Advantageously, such an approach to generating the regions or segments (e.g., performed by the region generator 120).

In some embodiments, AR glasses do not typically have a heads-up display for displaying to a user or wearer the field of view of the camera. Accordingly, the wearers do not always know whether the subject of a video or photo is within the field of view. The image processing system 100 described herein can advantageously use the regions or segments generated by the region generator 120 to provide audio cues to the wearer when an object or subject moves out of the field of view of the camera 114. For example, if a "fast" region is moving out of the field of view of the camera 114, the AR device can provide an audio cue (e.g., in the form of a verbal cue "left" or "right") to prompt the wearer to rotate or move their head in response to the cue. Over time, the wearer can be trained by the audio cues to understand the field of view of the camera 114 and where subjects are located in the field of view. Additionally or alternatively, the cues can include visual cues (e.g., LEDs in glasses frames) to cue the wearer to move their head to center a subject based on the regions or segments as determined by the region generator 120.

ROI Segmentation Based on In-Image Motion

Referring particularly to FIGS. 1 and 2-4, the image processing system 100 can be configured to obtain two or more anchor frames (e.g., full frames) from the camera 114 (and/or lenses 108), perform an image analysis technique based on the anchor frames, and determine, generate, calculate, or define two or more different ROIs for different areas of a field of view of the camera 114 or lenses 108 that have different degrees or amounts of motion. For example, the processing circuitry 116, or more particularly the image analysis manager 118 may identify different areas of the field of view of the camera 114 that have a high, medium, or low degree of motion, and the processing circuitry 116, or more particularly, the region generator 120, may generate or define different ROIs or image segments associated with each of the different areas for subsequent image capture (e.g., at adjusted frame rates and/or adjusted image resolution or quality to conserve energy consumption).

Figure 2:
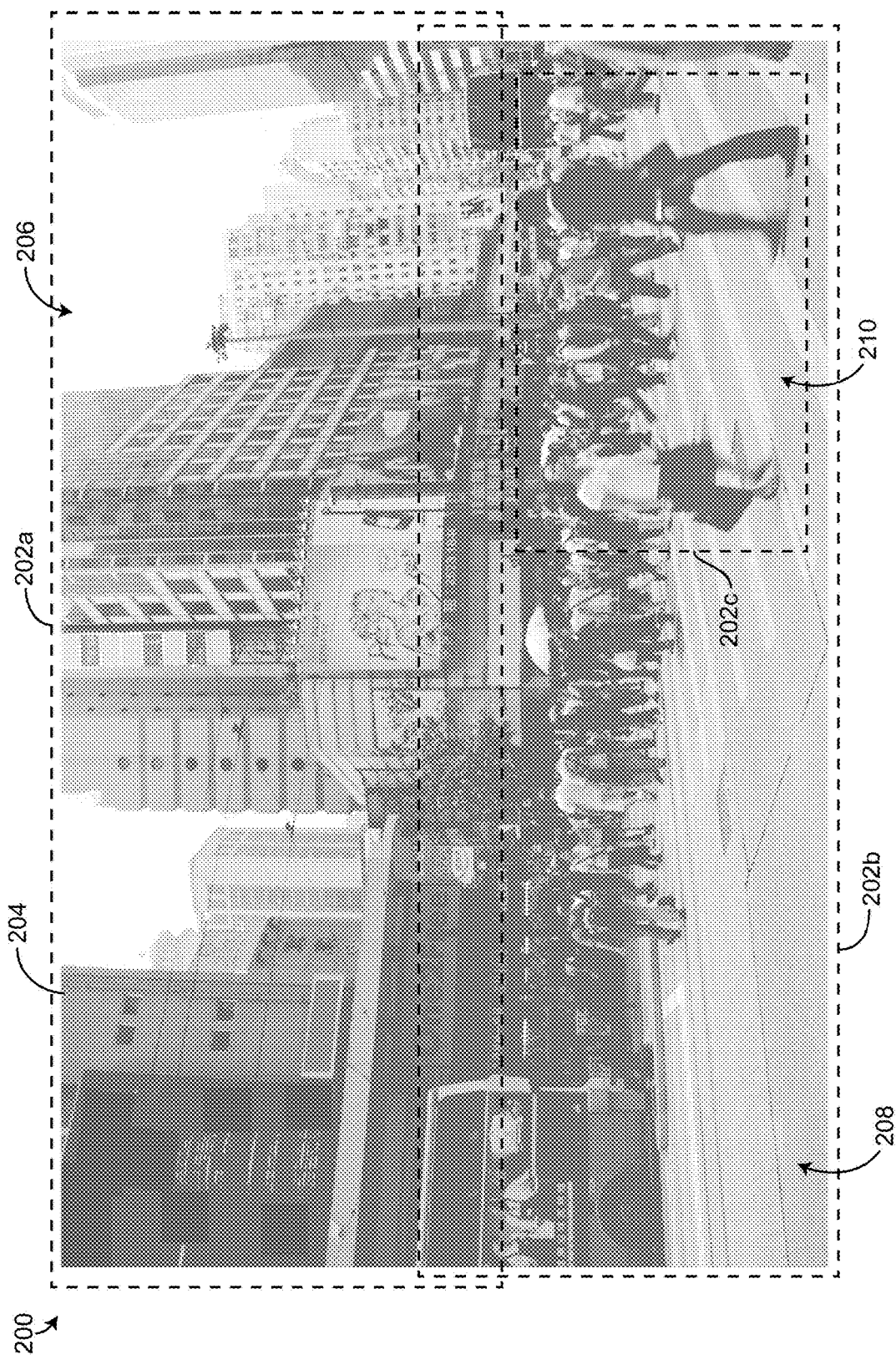
FIG. 2 is a diagram of a field of view or a frame of a camera showing different regions defined based on detected motion, according to some embodiments.

Referring particularly to FIG. 2, a field of view 200 of a camera (e.g., camera 114) is shown for capturing an image 204 (or a frame of a video), according to some embodiments. In some embodiments, the field of view 200 is of an environment, an area, a surrounding real-world environment, an AR environment, etc. The field of view 200 of the environment may include a low motion area 206, a medium motion area 208, and a high motion area 210. In some embodiments, the low motion area 206 is associated with a minimal or negligible amount of motion, image change between subsequently captured frames of the field of view 200 of the environment, or changes in pixels between subsequently captured frames of the field of view 200 of the environment. Similarly, the medium motion area 208 can be an area where a non-negligible amount or degree of motion occurs. The high motion area 210 can be an area of the field of view 200 where there is a high amount or degree of motion, indicating that a higher frame rate and/or a higher image resolution should be used to capture image data of the high motion area 210. In some embodiments, the degree or amount of motion is quantified by the image analysis manager 118 (e.g., based on anchor frames) using an image analysis technique, motion vectors, etc. It should be understood that while FIG. 2 shows only three different areas or three different degrees of identified motion (e.g., high, medium, and low), any number of different areas can be detected based on relative or absolute degree of motion, image change, etc. (e.g., more than three, or less than three).

Referring still to FIG. 2, the image 204 can be divided, segmented, etc., into various ROIs 202 (e.g., by region generator 120). Specifically, the image 204 can be divided into a low motion ROI 202a, a medium motion ROI 202b, and a high motion ROI 202c. In some embodiments, the low motion ROI 202a surrounds, includes, encompasses, is proximate, etc., the low motion area 206. Similarly, the medium motion ROI 202b can surround, include, encompass, be proximate to, etc., the medium motion area 208, and the high motion ROI 202c can surround, include, encompass, be proximate to, etc., the high motion area 210. The ROIs 202 can overlap each other, thereby sharing similar image or pixel information (e.g., for use in constructing, stitching, etc., a unified or full image). The ROIs 202 can be segments or portions of the image 204.

Figure 3:
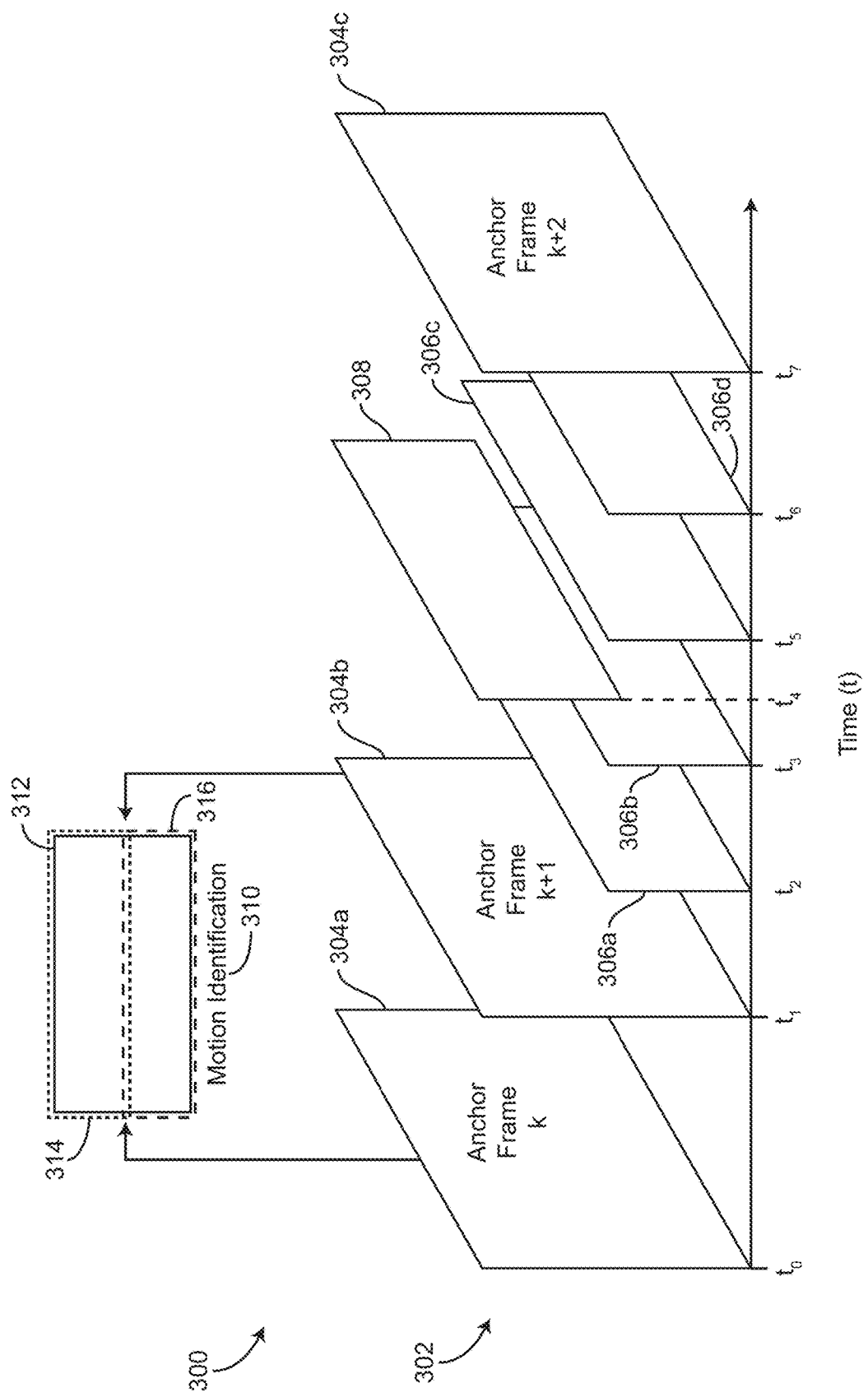
FIG. 3 is a diagram showing a timeline including anchor frames and different partial frames captured at different frame rates and/or image resolutions, according to some embodiments.

Referring particularly to FIG. 3, a diagram 300 illustrates capture of anchor frames, motion identification and region generation, and subsequent capture of portions of a field of view at adjusted frame rates and/or adjusted image resolutions. For example, timeline 302 illustrates the capture of anchor frames, and portions of a frame. At time $t_0$, a kth anchor frame 304a is captured, and at time $t_1$, a k+1 anchor frame 304b is captured. In some embodiments, an amount of elapsed time $\Delta t_{fr,1}$ between the times $t_0$ and $t_1$ at which the anchor frames 304a and 304b are capture is inversely proportional to a frame rate $FR_1$ at which anchor frames 304a and 304b are initially captured. For example, the elapsed time $\Delta t_{fr,1}$ between times $t_0$ and $t_1$ (e.g., $\Delta t_{fr,1} = t_1 - t_0$) is equal to:

$$\Delta t_{fr,1} = \frac{1}{FR_1}$$

where $FR_1$ is the frame rate at which anchor frames 304a and 304b are captured. If the frame rate $FR_1$, for example, is 24 frames per second (FPS), the amount of elapsed time $\Delta t_{fr,1}$ may be $$\frac{1}{24\frac{\text{frames}}{\text{sec}}}$$

or approximately 0.0416 seconds. Similarly, if the frame rate $FR_1$ is 60 FPS or 30 FPS, the amount of elapsed time $\Delta t_{fr,1}$ may be approximately 0.0166 seconds or 0.0333 seconds, respectively. It should be understood that while the frame rate $FR_1$ is described herein as being 24 FPS, 60 FPS, or 30 FPS, the frame rate $FR_1$ may be any value. It should also be understood that while FIG. 3 shows the capture of anchor frames 304a and 304b for motion identification, any number of anchor frames may be captured for performing motion identification (e.g., 2, 10, one second's worth of frames, etc.). In some embodiments, multiple anchor frames 304 are obtained for motion identification, but temporally adjacent or neighboring anchor frames are not used for motion identification, and anchor frames 304 that are temporally spaced further apart from each other than a time interval between subsequently captured anchor frames 304 are used for motion identification. For example, 10 anchor frames 304 (or any other number of anchor frames) can be captured at a framerate and/or a specific image resolution, but the first and eighth anchor frames 304, the first and tenth anchor frames 304, etc., are used for motion identification.

Motion identification 310 and image segmentation can be performed using at least the anchor frames 304a and 304b. For example, image analysis manager 118 can receive the anchor frame 304a and the anchor frame 304b and compare the anchor frames 304a and 304b to each other to identify different areas of a field of view 312 of a camera (e.g., the camera 114 or lenses 108) based on a degree of motion detected or determined. FIG. 3 shows the motion identification 310 being performed based on the anchor frames 304a and 304b, and used to determine a first region 314 and a second region 316 of the field of view 312, where the first region 314 and the second region 316 are associated with different corresponding degrees of motion at the regions 314 and 316, detected based on the comparison between the anchor frames 304a and 304b. In some embodiments, an image analysis technique is performed by the image analysis manager 118 based on the anchor frames 304a and 304b, to identify different areas of the field of view 312 that have high and low relative motion, and the region generator 120 generates the ROIs 314 and 316 based on the results of the motion identification 310 performed by the image analysis manager 118.

When the motion identification 310 and image segmentation has been performed to define or generate the regions 314 and 316, the regions 314 and 316 can be captured subsequently at adjusted frame rates and/or adjusted image resolutions. For example, if the second region 316 is a high motion region, and the first region 314 is a low or lower motion region, partial frames 306 associated with the second region 316 can be captured at a higher frame rate and/or image resolution than a frame rate and/or image resolution at which partial frames 308 associated with the low motion region 314 are captured. As shown in FIG. 3, the partial frames 306 are captured at times $t_2$, $t_3$, $t_5$, and $t_6$ according to a frame rate $FR_2$ and/or a corresponding resolution. A time duration that occurs between time $t_1$ and $t_2$ may be the same as or equal to a time duration that occurs between times $t_2$ and $t_3$, times $t_3$ and $t_5$, and times $t_5$ and $t_6$. In some embodiments, the time duration that occurs between times $t_2$ and $t_3$ is $t_3-t_2=\Delta t_{fr,2}$. In some embodiments, the time duration $\Delta t_{fr,2}$ is inversely proportional to a frame rate $FR_2$ and/or image resolution for capture of the partial frames 306a-306d of the region 316

$$\left(\text{e.g., } \Delta t_{fr,2} = \frac{1}{FR_2}\right).$$

In some embodiments, the partial frame(s) 308 is shown captured at a time $t_4$. It should be understood that while only one partial frame 308 is shown captured in FIG. 3, any number of partial frames 308 for the first region 314 can be captured after performance of the motion identification 310 and image segmentation/region generation, prior to capture of a k+2 anchor frame 304c (described in greater detail below).

The partial frame 308 is captured at a time $t_4$ at a time interval or time duration $\Delta t_{fr,3}$ (e.g., where $t_4=t_1+\Delta t_{fr,3}$) that is inversely proportional to the frame rate $FR_3$ and/or image resolution at which partial frame(s) 308 are captured. Specifically, the partial frame 308 can be captured at a time $t_4=t_1+\Delta t_{fr,3}$. In some embodiments, the frame rate $FR_3$ and/or image resolution is greater than the frame rate $FR_2$ and/or image resolution at which the high motion partial frames 306 are captured to thereby improve image capture of the high motion region (e.g., second region 316). Similarly, the low motion area (e.g., the first region 314) can be captured less frequently (see partial frame 308) since lower motion areas may not require as many frames to accurately capture image data. In some embodiments, image data captured by the partial frame 308 can be re-used for the times at which the partial frames 306 are captured to construct full frames of the field of view 312 as captured by the camera (e.g., camera 114).

In some embodiments, k+2 anchor frame 304c can be captured at a later time (e.g., at a time $t_7$). The time at which the anchor frame 304c is captured can be a predetermined amount of time after capture of the anchor frame 304b. In some embodiments, the anchor frame 304c is obtained in response to sensor data (e.g., from any of the sensors 104 such as the IMU/VIO sensor(s) 110, etc.). In some embodiments, the anchor frame 304c is obtained in response to a user input.

The anchor frame 304c is used in combination with an earlier captured anchor frame (e.g., anchor frame 304b) or with an earlier constructed frame (e.g., a constructed full frame for time $t_6$ that includes the partial frame 306d and the partial frame 308 constructed or stitched together to result in a full frame) to re-perform the motion identification 310. In some embodiments, the anchor frame 304c is used in combination with another frame (e.g., a previously or earlier captured anchor frame 304 and/or a previously or earlier constructed full frame) to re-identify areas of high motion, and to re-generate or re-define different ROIs (e.g., to redefine the first region 314 and/or the second region 316, to generate new regions, etc.).

In some embodiments, performing the motion identification 310 also includes determining a frame rate and a resolution or image quality for each of the defined segments, ROIs, partial frames, etc. For example, an initial performance of the motion identification 310 can result in the frame rate $FR_2$ and the frame rate $FR_3$ (and similarly determined or adjusted image resolutions) for subsequently obtaining the partial frames 306 and the partial frame(s) 308. Similarly, when new anchor frames (e.g., anchor frame 304c) are captured, the motion identification 316 can be performed to re-define the previously defined ROIs, and/or to define new ROIs, and to determine a frame rate and/or image resolution for subsequent capture of each of the ROIs. In some embodiments, the frame rate and/or image resolution for each of the ROIs is proportional to a quantifiable degree or amount of motion detected or determined in the field of view 312. For example, high motion ROIs can be assigned a higher frame rate and/or a higher image resolution, while lower motion ROIs are assigned a lower frame rate and/or a lower image resolution to conserve power without sacrificing image quality.

It should be understood that while FIG. 3 shows the performance of motion identification to generate only two ROIs and subsequent frame capture of said ROIs (e.g., region 314 and region 316, and partial frames 306 and 308), such ROIs are shown for illustrative purposes only, and the systems and methods described herein should not be understood as limited to only two ROIs. Specifically, any number of ROIs (e.g., shown in FIGS. 2 and 4) can be identified and generated using anchor frames and associated motion identification. It should be understood that the ROIs can have any shape (e.g., rectangular, circular, irregular, etc.) and the shapes shown herein should not be understood as limiting.

Figure 4:
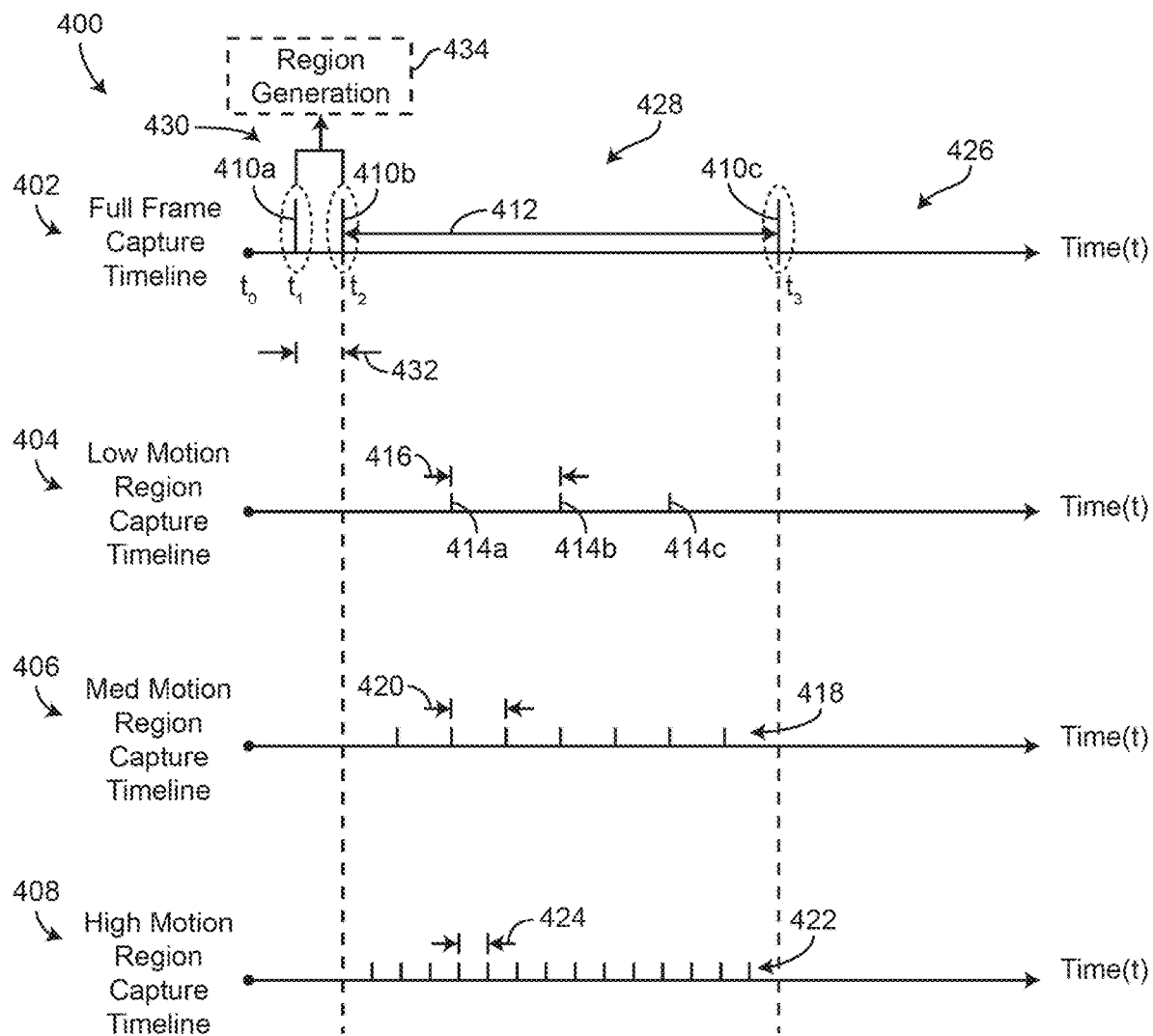
FIG. 4 is a diagram illustrating frame rates for frame capture, low motion region capture, medium motion region capture, and high motion region capture, according to some embodiments.

Referring particularly to FIG. 4, a diagram 400 of various timelines 402-408 illustrating different frame rates and capture of partial frames or different regions is shown, according to some embodiments. Specifically, diagram 400 includes a full frame or anchor frame capture timeline 402, a low motion region capture timeline 404, a medium motion region capture timeline 406, and a high motion region capture timeline 408. It should be understood that while diagram 400 and the various timelines 402-408 as described herein are described with reference to image segmentation or region definition that is based on determined motion present in different portions of captured images, the various timelines 402-408 may be similar for any of the other techniques for image segmentation (e.g., object identification image segmentation or ROI generation, audio source identification image segmentation or ROI generation, head motion image segmentation, depth image segmentation, etc., or any combination thereof). Further, while FIG. 4 only shows four timelines 402-408, the systems and methods described herein should not be understood as being limited to capturing image data according to only four timelines.

As shown in FIG. 4, the timelines 402-408 are divided into a first portion 430, a second portion 428, and a third portion 426. A first anchor frame 410a and a second anchor frame 410b are captured during the first portion 430 and are used to define different segments of an image, or to generate or define different ROIs (shown as region generation 434). The region generator 434 can be performed by the image analysis manager 118 and the region generator 120 using any of the techniques described herein. In the non-limiting example shown in FIG. 4, the region generation 434 results in three different ROIs, namely a low motion region, a medium motion region, and a high motion region, according to some embodiments. The anchor frames 410 can be captured at a time interval 432 that is based on a first frame rate (e.g., the frame rate $FR_1$ as described in greater detail above with reference to FIG. 3) for the anchor frames 410 during the first portion 430. In some embodiments, the first frame rate is a predetermined, predefined or normal frame rate (e.g., 24 FPS, 30 FPS, 60 FPS, etc.).

The second portion 428 can have a time duration 412 between capture of the anchor frame 410b and an anchor frame 410c that is used to update the previously defined ROIs, to generate new or additional ROIs, to re-define one or more of the ROIs, etc. In some embodiments, the second portion 428 ends whenever additional data is obtained for ROI generation, definition, or updating.

The region generation 434 can include determining a corresponding or associated frame rate for each of the defined ROIs. For example, the low motion region may be assigned a low motion frame rate $FR_{low}$, the medium motion region may be assigned a medium motion frame rate $FR_{med}$, and the high motion regions can be assigned a high motion frame rate $FR_{high}$. In some embodiments, the high motion frame rate $FR_{high}$ is greater than the medium motion frame rate $FR_{med}$, and the medium motion frame rate $FR_{med}$ is greater than low motion frame rate $FR_{low}$. In some embodiments, the frame rates $FR_{high}$, $FR_{med}$, and $FR_{low}$ are determined based on a determined amount of motion in each corresponding ROI. The different regions are subsequently captured according to the frame rates described herein.

During the second portion 428, the low motion regions are captured as partial frames 414 (e.g., partial frame 414a, partial frame 414b, partial frame 414c, etc.) temporally spaced apart time interval 416 according to a corresponding frame rate (e.g., $FR_{low}$). For example, if the time interval 416 is $\Delta t_{low}$ $$\left(\text{e.g., } \Delta t_{low} = \frac{1}{FR_{low}}\right),$$

the partial frame 414a may be obtained at a time $t_2 + \Delta t_{low}$ where the time $t_2$ is a beginning time of the second portion 428. Similarly, the partial frame 414b may be obtained at a time $t_2 + 2\Delta t_{low}$ and the partial frame 414c may be obtained at a time $t_2 + 3\Delta t_{low}$. An nth partial frame 414 can be obtained at a time $t_2 + n(\Delta t_{low})$.

During the second portion 428, the medium motion region or regions is/are captured as partial frames 418 temporally spaced apart time interval 420 according to a corresponding frame rate (e.g., $FR_{med}$). For example, if the time interval 420 is $\Delta t_{med}$ $$\left(\text{e.g., } \Delta t_{med} = \frac{1}{FR_{med}}\right),$$

an nth partial frame 418 may be obtained at time $t_2 + n(\Delta t_{med})$. Similarly, the high motion region or regions is/are captured as partial frames 422 spaced apart time interval 424 according to a corresponding frame rate (e.g., $FR_{high}$). For example, if the time interval 424 is $\Delta t_{high}$ $$\left(\text{e.g., } \Delta t_{high} = \frac{1}{FR_{high}}\right),$$

an nth partial frame 422 may be obtained at time $t_2 + n(\Delta t_{high})$. In some embodiments, the partial frames 414 are the same as or similar to the low motion ROI 202a, the partial frames 418 are the same as or similar to the medium motion ROI 202b, and the partial frames 422 are the same as or similar to the high motion ROI 202c as described in greater detail above with reference to FIG. 2. When additional data is obtained for re-performing the region generation 434 or for calibrating, updating, or otherwise adjusting or confirming the ROI generation (e.g., at time $t_3$), the third portion 426 initiates. In some embodiments, the third portion 426 is similar to the second portion 428 so that different regions are each captured according to a corresponding frame rate. In some embodiments, the third portion 426 is similar to the first portion 430, and the techniques described in detail herein with reference to the first portion 430 and the second portion 428 are repeated.

Head Motion Segmentation

Figure 5:
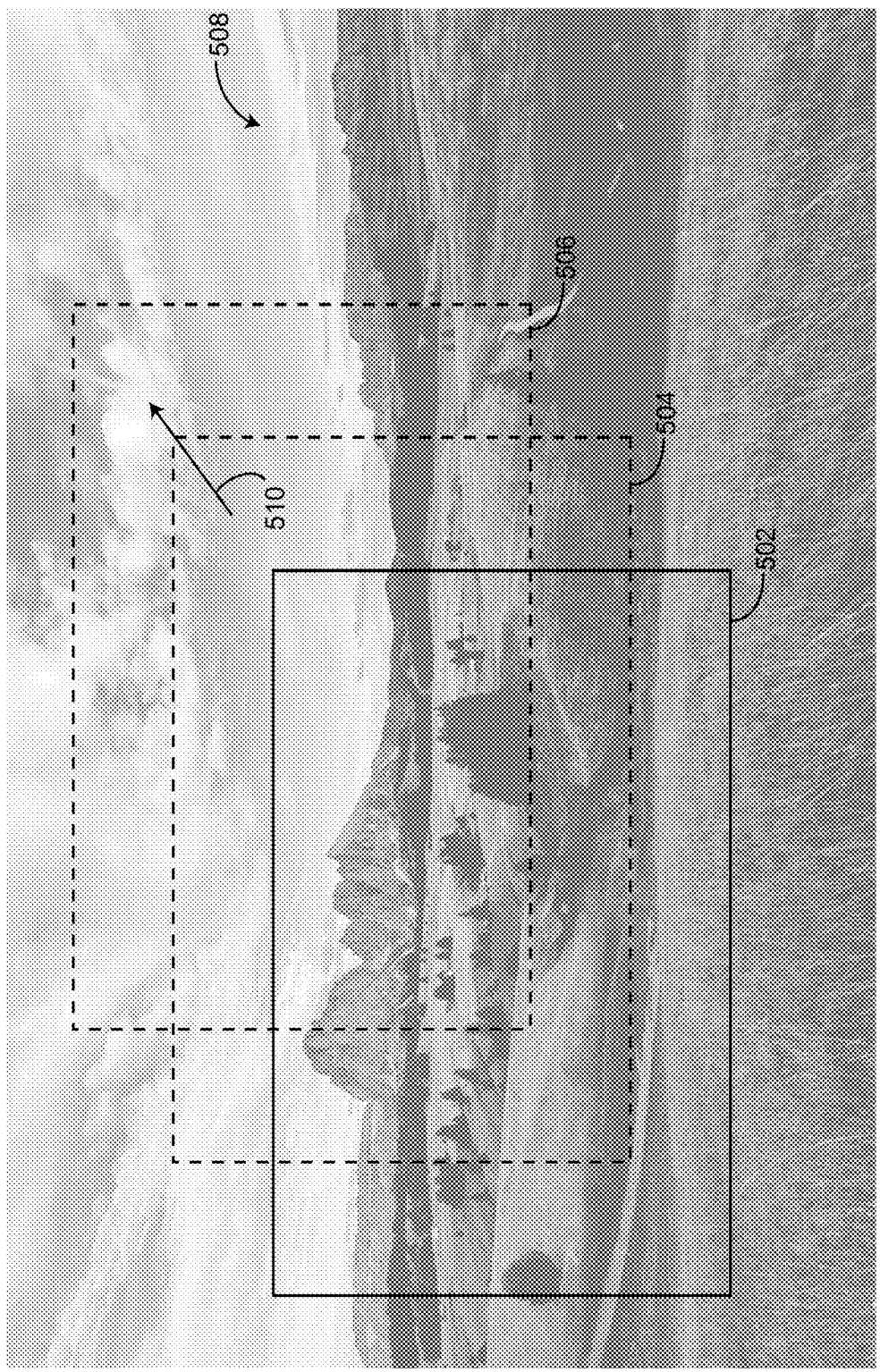
FIG. 5 is a diagram illustrating different fields of view of a camera as a user's head with which the camera is coupled moves, according to some embodiments.
Figure 6:
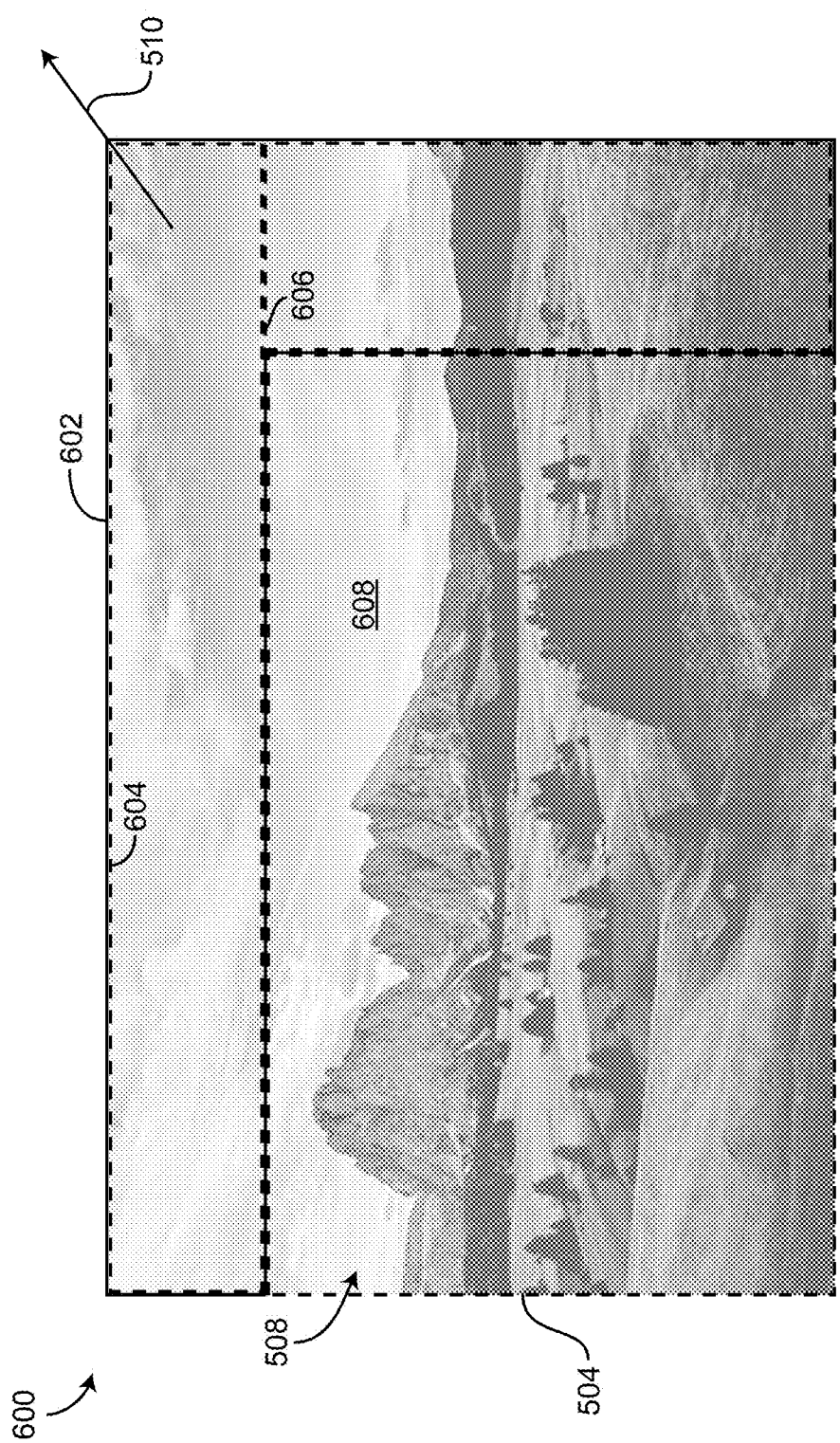
FIG. 6 is a diagram illustrating new regions of the field of view that occurs between a first field of view and a second field of view shown in FIG. 7 as the user's head moves, according to some embodiments.

Referring particularly to FIGS. 1 and 5-6, the image processing system 100 can be configured to detect, measure, or sense head motion to define one or more ROIs with associated frame rates and/or image resolutions. In some embodiments, the image analysis manager 118 is configured to obtain motion data from the IMU/VIO 110 and use the motion to determine a direction of motion of the user's head, and thereby a direction of motion of the camera 114 or lenses 108 that are used to capture image data. As shown in diagram 500 of FIG. 5, as a user's head moves to transition the camera 114 or lenses 108 in direction 510 across environment 508, a field of view 502 may shift to a new field of view 504 and later another field of view 506. A full frame is captured or constructed using any of the other techniques described herein of the field of view 502, according to some embodiments.

As shown in FIG. 6, when the camera 114 or lenses 108 are transitioned to the new field of view 504 of the environment 508, a portion of the new field of view 504 may be the same as or similar to an image or frame obtained of the field of view 502. Specifically, the new field of view 504 can be segmented or divided by the region generator 120 into new regions 602 and a previously obtained region 608 using the direction 510 and a magnitude associated with the direction 510 as determined by the image analysis manager 118 based on the motion data obtained from the IMU/VIO 110. In some embodiments, the image analysis manager 118 is configured to determine a displacement amount or an estimated distance in the field of view 504 that occurs between subsequently captured frames based on the motion data obtained from the IMU/VIO 110 (e.g., the magnitude and direction 510).

The new regions 602 can be captured (e.g., at a frame rate and an image resolution) to obtain new imagery that has come into the new field of view 504. In some embodiments, the new field of view 504 represents a field of view that the user views at a time when a next frame is captured relative to a time at which the user viewed the field of view 502. In some embodiments, the previously obtained region 608 is a portion of the new field of view 504 that overlaps the field of view 502. In some embodiments, the previously obtained region 608 is not captured when the frame is captured at the new field of view 504. Instead, a portion of the frame captured at field of view 502 can be re-used to generate a full frame of the new field of view 504.

In some embodiments, image data of the new regions 602 can be captured at the new field of view 504. The image data of the new regions 602 can be used in combination with the portion of the frame of the field of view 502 that overlaps with the new field of view 504 (e.g., the previously obtained region 608) to generate a full frame of the new field of view 504. In some embodiments, the new regions 602 include a first new region 604 along an upper edge of the new field of view 504 and a second new region 606 along a side edge of the new field of view 504. In some embodiments, a height of the first new region 604 is proportional to a component of the direction 510, or a motion vector of the user's head motion, that extends in an upwards direction (e.g., in a direction perpendicular with an upper edge of the new field of view 504). The height of the first new region 604 can be determined by the region generator, according to some embodiments. In some embodiments, a width of the second new region 606 is similarly proportional to a component of the direction 510, or a motion vector of the user's head motion, that extends in a rightwards direction (e.g., in a direction perpendicular with a right edge of the new field of view 504).

For example, if the user's head motion is in a completely rightwards direction, the new regions 602 may include only a region along the right edge of the new field of view 504 (where new image information is coming into the new field of view 504). In another example, if the user's head motion is in a completely downwards direction, the new regions 602 may include only a region along a bottom edge of the new field of view 504. For example, the IMU/VIO 110 provides a velocity or motion vector of the user's head:

$$\vec{v}_{head} = v_x \hat{i} + v_y \hat{j}$$

where $\vec{v}_{head}$ is a motion or velocity vector the user's head, $v_x$ is a horizontal component of the user's head motion, $v_y$ is a vertical component of the user's head motion, and $\hat{i}$ and $\hat{j}$ are unit vectors. In some embodiments, the velocity or motion vector of the user's head is expressed or obtained in any other coordinate system (e.g., Cartesian, cylindrical, spherical, etc.). In some embodiments, the region generator 120 is configured to determine a width and height of the first new region 604 and the second new region 604, respectively, using the horizontal component of the user's head motion and the vertical component of the user's head motion. For example, the width of the second new region 606 can be determined based on the horizontal component of the user's head motion:

$$w = f_{width}(v_x)$$

and the height of the first new region 604 can be determined based on the vertical component of the user's head motion:

$$h = f_{height}(v_y)$$

where w is the width of the second region 606 or a region along a left or right edge of the new field of view 504, h is the height of the first new region 604 or a region along a top or bottom edge of the new field of view 504, $f_{width}$ is a relationship, equation, function, etc., to relate w and $v_x$, and $f_{height}$ is a relationship, equation, function, etc., to relate h and $v_y$.

The image data of the new regions 602 can be obtained and used with image data of the previously obtained region 608 (e.g., from a previously captured or constructed frame) to construct a full frame of the new field of view 504. Field of view 506 can be similarly obtained, according to some embodiments. In some embodiments, any of the frame construction techniques described throughout the present disclosure are implemented by the image signal processor 122 or the image signal post-processor 124.

Depth Segmentation

Figure 7:
FIG. 7 is a diagram illustrating different regions of a field of view of a camera that are defined based on identified relative depth of an environment relative to the camera, according to some embodiments.

Referring particularly to FIGS. 1 and 7, the image processing system 100 can be configured to generate ROIs and capture different ROIs at various frame rates and/or image resolutions based on a depth detection of a surrounding environment. For example, as shown in diagram 700 of FIG. 7, the environment 508 can include a foreground 512 and a background 514. In some embodiments, the foreground 512 and the background 514 are located at different depths relative to the camera 114. A field of view 702 of the camera 114 is shown to include portions of both the foreground 512 and the background 514. In some embodiments, one or more anchor frames of the field of view 702 of the environment 508 are obtained, and the image analysis manager 118 performs a depth estimation technique to identify which areas of image data in the field of view 702 are closer to the camera 114 than other areas.

In some embodiments, depth estimation is performed using a variety of different techniques. For example, the depth estimation and thereby the definition of the ROIs can be performed based on triangulation of stereo images, multiple frames or images from a sensor (e.g., time series frames received from the camera 114), a single image with a structured light projector that projects a custom invisible (e.g., infrared) pattern, a TOF sensor, a LIDAR sensor, an ultrasound sensor, an electric magnetic field sensor, etc. In some embodiments, the processing circuitry 116 obtains image data from the lenses 108 or the camera 114, and/or obtains depth data from a depth sensor (e.g., depth sensor 1016) to perform the depth estimation.

In some embodiments, the region generator 120 is configured to generate a first region 704 associated with the foreground 512 that is within the field of view 702, and a second region 706 associated with the background 514 that is within the field of view 702. In some embodiments, the first region 704 and the second region 706 overlap some amount to facilitate stitching or construction of full frames. In some embodiments, the region generator 120 is also configured to determine or assign a corresponding frame rate and/or image quality for each of the first region 704 and the second region 706. In some embodiments, the frame rate associated with the first region 704 is greater than the frame rate associated with the second region 706. Similarly, the image quality at which the first region 704 is captured may be greater than the image quality at which the second region 706 is captured. Since foreground image data may be more likely to change over time (or with head motion), the frame rate associated with the first region 704 is greater than the frame rate associated with the second region 706, and similarly the image quality of the first region 704 can be greater than the image quality associated with the second region 706.

In some embodiments, the region generator 120 and/or the image signal processor 122 are configured to operate the camera 114 to obtain image data of the first region 704 and the second region 706 according to the determined frame rates and/or determined image qualities. For example, image data of the first region 704 can be obtained at a frame rate of 60 FPS in some embodiments, while image data of the second region 706 can be obtained at a lower frame rate such as 15 FPS. The image data of the first region 704 and the image data of the second region 706 can be combined or stitched together to generate full frames at a desired framerate and/or overall image quality for a video file.

It should be understood that any of the region generation or image segmentation techniques described herein can be used in combination. For example, if particular portions of the second region 706 associated with the background 514 include moving objects or subjects (e.g., a moving car in the distance), the image processing system 100 can generate motion based ROIs (as described in greater detail above with reference to FIGS. 2-4) within the second region 706 and/or the first region 704.

Audio Source and Object Detection Segmentation

Figure 8:
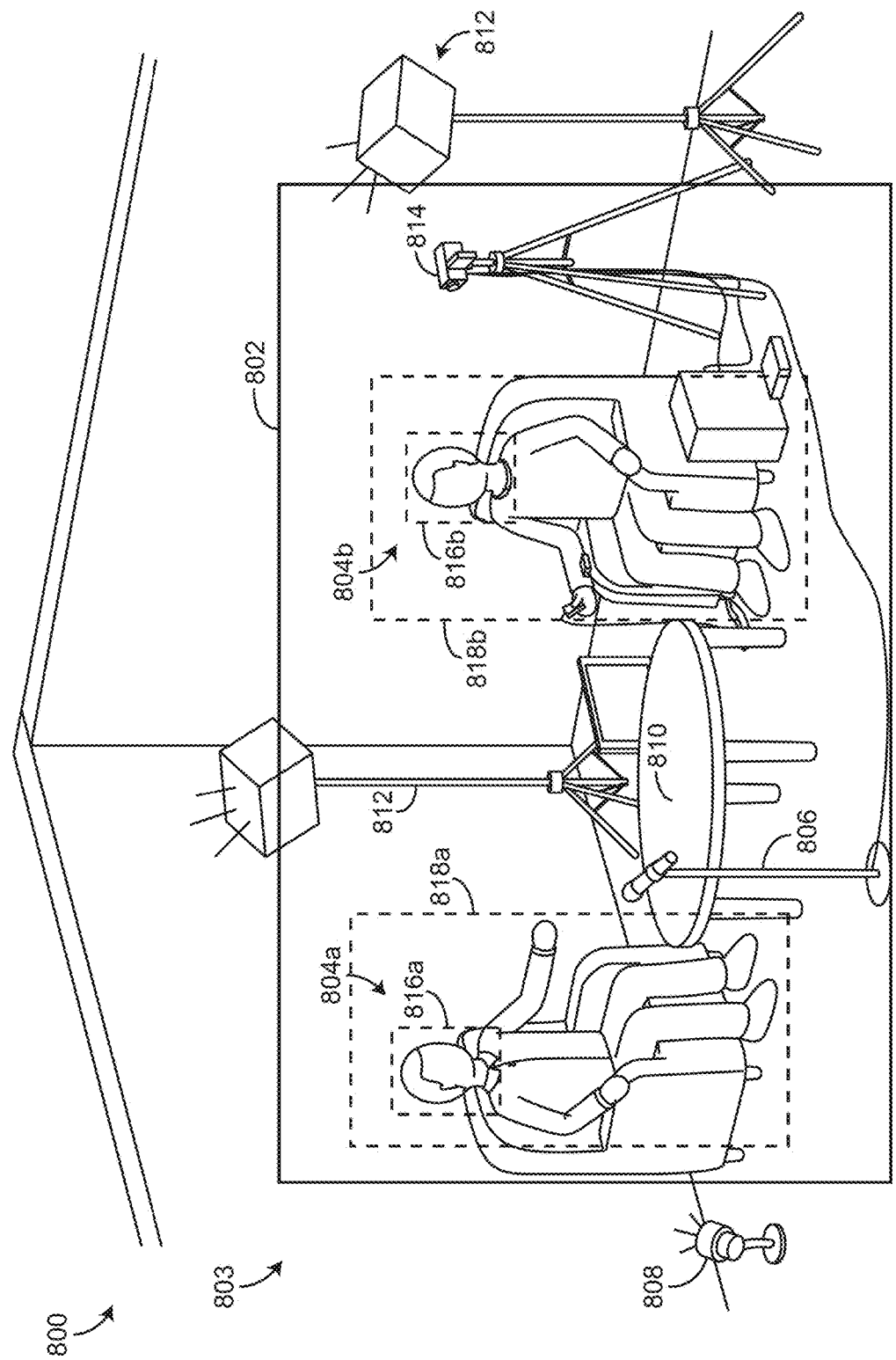
FIG. 8 is a diagram of a field of view of a camera for an environment including different types of subjects or objects, and different spatial audio sources, with regions generated based on a spatial location of an audio source or based on a neural network object detection technique, according to some embodiments.

Referring particularly to FIGS. 1 and 8, the image processing system 100 can be configured to generate ROIs based on environmental audio source locations, and/or based on object detection, according to some embodiments. In some embodiments, the image processing system 100 can identify a location of a point audio source using spatial audio data obtained from the spatial audio device 112. The spatial audio device 112 can include a microphone, an array of microphones, etc., to facilitate triangulation or source location determination relative to the spatial audio devices 112, or the wearable glasses on which the image processing system 100 is implemented or with which the image processing system 100 is associated.

As shown in diagram 800 of FIG. 8, the camera 114 can be configured to obtain image data of a field of view 802 of an environment 803. The environment 803 is shown to include a first individual 804a, and a second individual 804b. If the first individual 804a and the second individual 804b are speaking, or generating noise, the spatial audio data may indicate a location of the first individual 804a and a location of the second individual 804b within the field of view 802. In some embodiments, the region generator 120 is configured to generate a first region 816a at the first individual 804a and a second region 816b for the second individual 804b. The first region 816a may be generated to cover or encompass the first individual's 804a face, according to some embodiments. Similarly, the second region 816b can be generated to cover or encompass the second individual's 804b face, according to some embodiments. In some embodiments, the first region 816a and the second region 816b are each centered at a point location of an audio source.

In some embodiments, the region generator 120 is also configured to generate a first surrounding region 818a and a second surrounding region 818b. The first surrounding region 818a surrounds the first region 816a, and the second surrounding region 818b surrounds the second region 816b, according to some embodiments. In some embodiments, areas or portions of the field of view 802 that surround or are proximate a spatial audio or point source are expected to have a higher significance than other areas of the field of view 802 and are therefore assigned the surrounding regions 818 (e.g., by the region generator 120).

In some embodiments, the different regions 816a, 816b, 818a, and 818b are assigned different frame rates and/or different image qualities by the region generator 120. For example, the first region 816a and the second region 816b can be assigned a frame rate higher and a higher image quality than a frame rate and an image quality that is assigned to the first surrounding region 818a and the second surrounding region 818b, according to some embodiments. In some embodiments, any other areas of the field of view 802 that are outside the first and second regions 816a and 816b, or that are outside the first and second surrounding regions 818a and 818b are assigned a lower frame rate (e.g., a frame rate lower than both the frame rates assigned to the first and second regions 816a and 816b, and the first and second surrounding regions 818a and 818b). In some embodiments, areas of the field of view 802 that are outside the first and second regions 816a and 816b, or that are outside the first and second surrounding regions 818a and 818b are captured when a full frame of the field of view 802 is captured at a lower frame rate.

In some embodiments, the image analysis manager 118 is configured to obtain one or more anchor frames of the field of view 802 (e.g., full frames) and perform an image analysis or object detection technique to identify different types of objects, subjects, etc., within the one or more anchor frames. For example, as shown in FIG. 8, the environment includes individuals 804 (e.g., people), a table 810, lights 812 and 808, a microphone 806, a camera 814, etc. In some embodiments, the image analysis manager 118 is configured to perform the image analysis or object detection technique to identify each of the different objects, individuals, etc., that are within the field of view 802. In some embodiments, the image analysis manager 118 is configured to provide results of the image analysis technique or object detection technique (e.g., which objects are detected, and where in the anchor frames the objects are detected) to the region generator 120 for generation of a corresponding region, an associated frame rate, and an associated image resolution or quality. In some embodiments, the image analysis manager 118 is configured to use a neural network object detection or recognition technique to identify or detect the different objects or subjects within the field of view 802 based on image data of the one or more anchor frames. In some embodiments, the image analysis manager 118 is configured to perform a facial recognition technique to identify subjects within the field of view 802 and a corresponding location of the subjects within the field of view 802. Advantageously, facial recognition may identify people or faces, which are captured at a higher frame rate and/or with a higher image quality or resolution to improve video quality.

In some embodiments, the region generator 120 is configured to generate different regions, corresponding frame rates, and corresponding image resolutions based on the results of the image analysis, object detection, or facial recognition technique as performed by the image analysis manager 118. For example, the region generator 120 can use a database of different types of objects or subjects that may have varying degrees of motion or importance, and generate different regions with different frame rates and/or image resolutions according to the database and the results of the image analysis manager 118. In one example, the region generator 120 can determine, based on the results of the image analysis, which of the detected objects are inanimate objects, and which are likely to move (e.g., organic or living subjects, etc.), and can generate the regions, the associated frame rates, and associated image resolutions for the different inanimate or animate objects or subjects. In some embodiments, an inanimate object such as a chair, a couch, a light, a wall, etc., may be assigned a region with a lower frame rate than animate objects such as animals, cars, etc., or people. In some embodiments, the region generator 120 is configured to generate regions and/or frame rates for the different regions for animate objects. In some embodiments, inanimate objects, surrounding environment, stationary elements, etc., of the field of view 802 are not assigned regions by the region generator 120, and image data of such inanimate objects, surrounding environment, stationary elements, etc., is obtained by intermittently or periodically capturing full frames of the field of view 802 (e.g., anchor frames). In some embodiments, the region generator 120 is configured to define or generate regions for the inanimate objects with lower frame rates than frame rates for regions that include animate objects such as people, animals, cars, faces, etc. In some embodiments, a predetermined set of frame rates are assigned to different types of objects (e.g., stored in the database) and the region generator 120 assigns the appropriate or corresponding predetermined frame rates to each of the detected objects (e.g., based on the results of the image analysis manager 118). Advantageously, even if a subject is not currently moving and therefore may not otherwise quality for high resolution or high frame rate capture, the subject can be detected using the techniques described herein and may be prioritized by the image processing system 100 as having a higher frame rate and a higher resolution, especially if the subject begins to unpredictably move, speak, etc. Advantageously, for human subjects, the frame rate and resolution may be relatively high in order to capture facial expressions and movement, even if the subject is not currently speaking.

System Architecture

Figure 16:
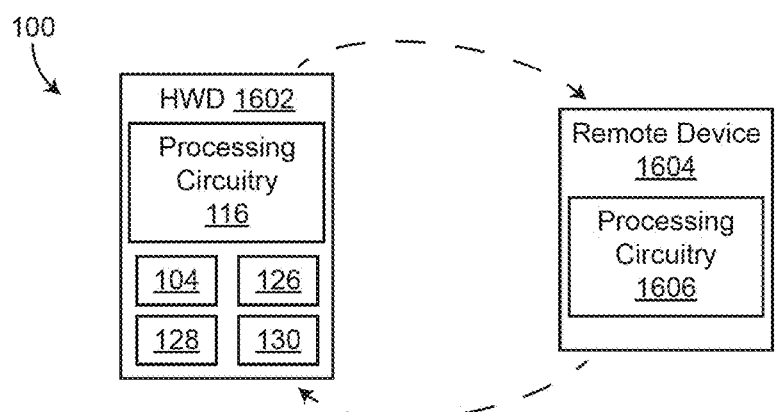
FIG. 16 is a block diagram of a system architecture on which the image processing system of FIG. 1 can be implemented, according to some embodiments.

Referring particularly to FIG. 16, the image processing system 100 can be performed across a HWD 1602 (e.g., AR glasses, VR glasses, AR goggles, etc.) and a remote device 1604, according to some embodiments. In some embodiments, the HWD 1602 includes the processing circuitry 116, the sensors 104, and the battery 126. In some embodiments, the HWD 1602 is configured to operate one or more of the sensors 104 to obtain image data (e.g., full frames, anchor frames, partial frames, etc., or any combination thereof) according to a frame rate, or different frame rates and to capture image data at a corresponding image resolution. In some embodiments, the processing circuitry 116 of the HWD 1602 is configured to perform any of the image analysis, image segmentation, frame rate determination, image capture quality, image capture resolution, motion detection, depth detection, frame rate adjustment, ROI definition, etc., techniques described herein. For example, the processing circuitry 116 of the HWD 1602 is configured to perform any of the techniques of the image analysis manager 118 and/or the region generator 120 as described in greater detail above, according to some embodiments. In some embodiments, the processing circuitry 116 of the HWD 1602 is also configured to perform any of the functionality of the image signal processor 122. In some embodiments, all of the functionality, techniques, etc., described throughout the present disclosure are performed by the processing circuitry 116 of the HWD 1602.

In some embodiments, processing circuitry 1606 of the remote device 1604 is configured to communicate with the processing circuitry 116 of the HWD 1602. In some embodiments, the processing circuitry 1606 of the remote device 1604 is configured to perform any of the techniques or functionality described herein to construct, stitch, generate, etc., full frames based on any of, or any combination of, partial frames, full frames, anchor frames, etc. In some embodiments, the processing circuitry 1606 is configured to perform any of the functionality of the image signal post-processor 124. In some embodiments, the processing circuitry 1606 is configured to perform any of the functionality of the image analysis manager 118. For example the processing circuitry 1606 of the remote device 1604 can be configured to perform any of the motion estimation as described in greater detail above with reference to FIGS. 1 and 2-4, the head motion estimations as described in greater detail above with reference to FIGS. 1 and 5-6, the depth estimation as described in greater detail above with reference to FIGS. 1 and 7, or the audio source identification and/or object detection/image recognition techniques as described in greater detail above with reference to FIGS. 1 and 8. In some embodiments, the processing circuity 1606 of the remote device 1604 is configured to define any of the ROIs as described in greater detail above with reference to FIGS. 1-8. For example, the processing circuitry 1606 of the remote device 1604 is configured to perform any of the functionality of the region generator 120 as described in greater detail above with reference to FIGS. 1-8.

It should be understood that while FIG. 16 shows the HWD 1602 communicating with a single remote device 1604, any number of remote devices can be used to perform any of the techniques described throughout the present disclosure, according to some embodiments. In some embodiments, a plurality of remote devices 1604 are in communication with the HWD 1602 to facilitate remote performance of any of the techniques described herein (e.g., in a distributed manner). In some embodiments, the remote device 1604 is a user's smartphone in wireless (e.g., Bluetooth) communication with the HWD 1602. For example, the HWD 1602 can capture image data (e.g., full or partial frames, or any combination thereof) and provide the image data to the user's smartphone or personal device. In some embodiments, the remote device 1604 is or includes a data center, or a server farm. Advantageously, off-loading any of the computational requirements as described herein to a remote device reduces power consumption of the battery 126 of the HWD 1602.

Image Processing Systems

Figure 9:
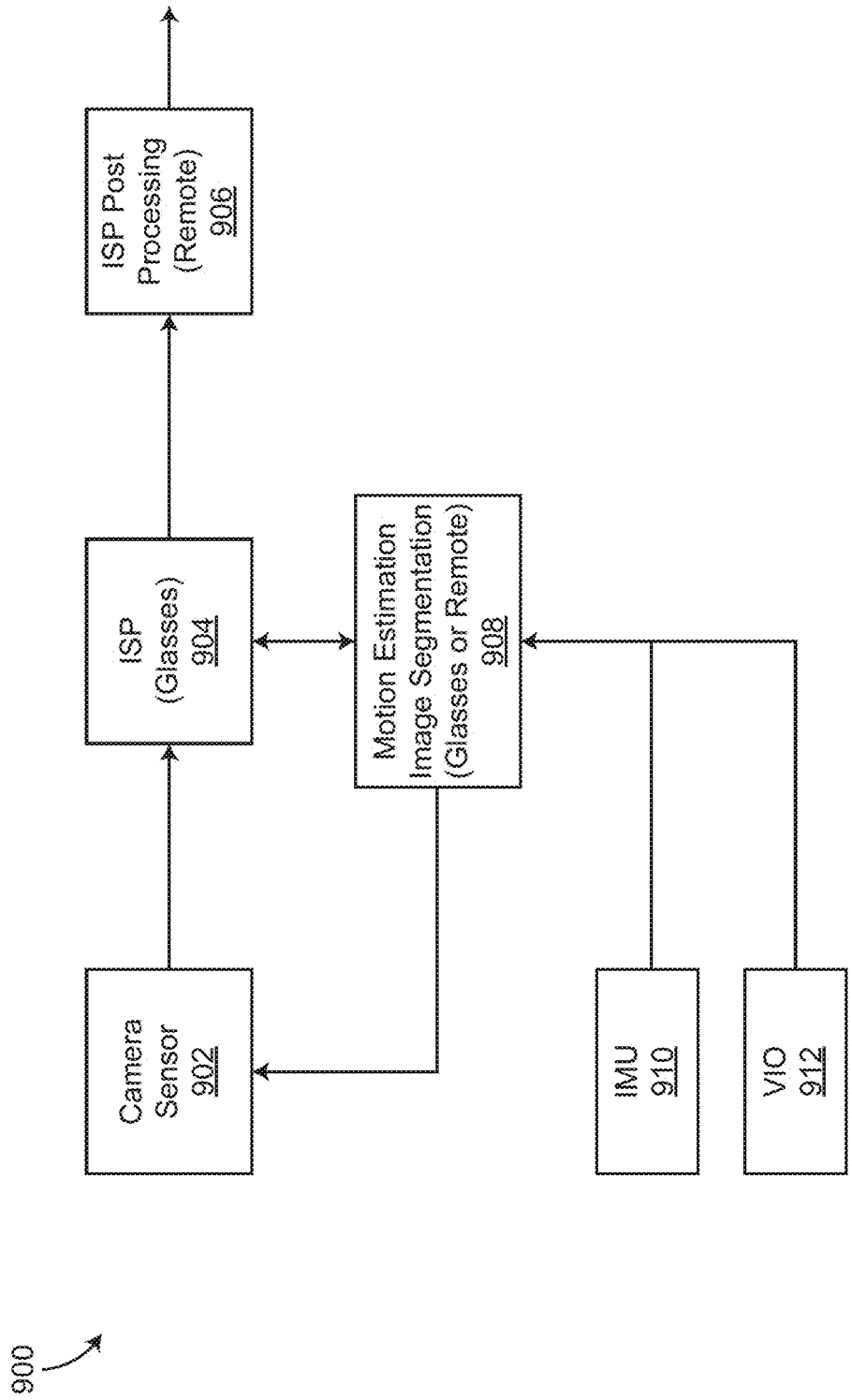
FIG. 9 is a block diagram illustrating an implementation of the image processing system of FIG. 1, according to some embodiments.
Figure 10:
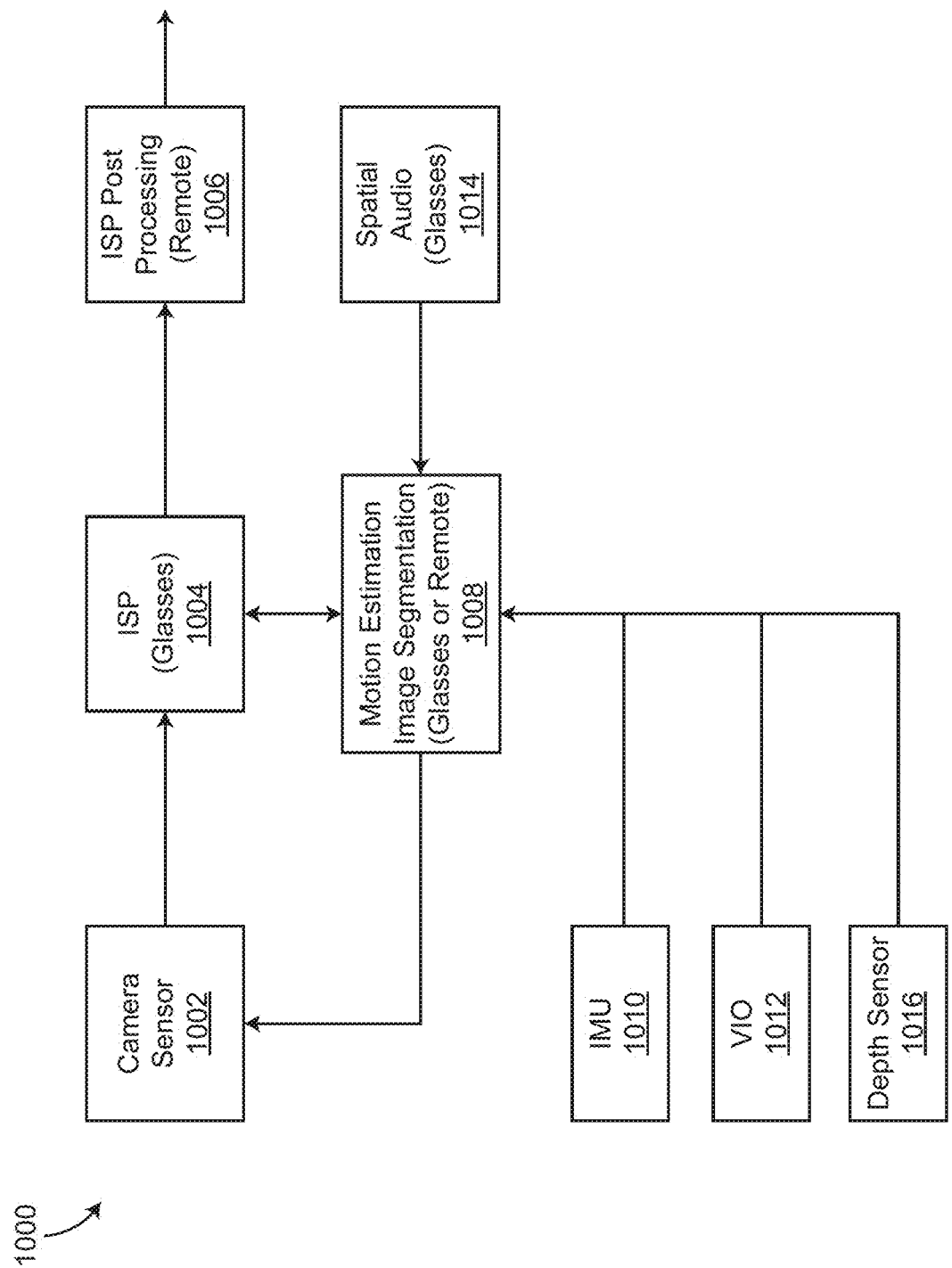
FIG. 10 is another block diagram illustrating another implementation of the processing system of FIG. 1, according to some embodiments.

Referring particularly to FIGS. 9 and 10, different block diagram representations of the image processing system 100 are shown, according to some embodiments. FIG. 9 shows a block diagram of system 900, and FIG. 10 shows a block diagram of system 1000, according to some embodiments.

Referring particularly to FIG. 9, the system 900 includes processing circuitry 908, an ISP 904, and an ISP post processor 906. The system 900 also includes a camera sensor 902, an IMU 910, and a VIO 912. In some embodiments, the processing circuitry 908 is the same as or similar to processing circuitry 116. In some embodiments, the processing circuitry 908 is configured to perform any of the functionality of the image analysis manager 118 and/or the region generator 120. In some embodiments, the ISP 904 is the same as or similar to the ISP 122 of the image processing system 100 as described in FIG. 1. In some embodiments, the ISP post processor 906 is the same as or similar to the ISP post processor 124 as described in greater detail above with reference to FIG. 1.

The processing circuitry 908 is configured to obtain orientation, head motion, head orientation, etc., of a user's head, or head wearable glasses on which the system 900 is implemented, according to some embodiments. In some embodiments, the processing circuitry 908 is configured to perform motion estimation and/or image segmentation using any of the techniques described herein based on sensor data obtained from the IMU 910 and/or the VIO 912. In some embodiments, the processing circuitry 908 is configured to obtain image data from the ISP 904. In some embodiments, the ISP 904 is configured to obtain sensor data from the camera sensor 902 and provide image data (e.g., full frames, partial frames, etc.) to the processing circuitry 908. In some embodiments, the processing circuitry 908 is configured to control the camera sensor 902 to obtain full frames, partial frames, imagery, image data, sensor data, etc. In some embodiments, the processing circuitry 908 is configured to control capture of imagery using the camera sensor 902 by controlling frame rate and/or image capture quality, cropping, regions of interest, etc., of the camera sensor 902 and operating the camera sensor 902 accordingly. In some embodiments, the camera sensor 902, the IMU 910, and the VIO 912 are all physically coupled with a wearable glasses or head display (e.g., VR goggles, AR goggles, an AR headset, etc.). In some embodiments, the processing circuitry 908 is configured to perform the motion estimation and image segmentation locally or remotely (e.g., locally at the wearable glasses or head display, or remotely at a remote system or network). In some embodiments, the ISP 904 is positioned locally at the wearable glasses or head display. In some embodiments, the ISP post processor 906 is configured to obtain the image data, frames, full frames, partial frames, etc. In some embodiments, the ISP post processor 906 is configured to perform any of the frame construction techniques or steps described herein. The ISP post processor 906 can be communicable with the ISP 904, and may be positioned remotely from processing circuitry of the wearable glasses. For example, the ISP post processor 906 can be implemented by a server, a network, a personal computer device of the user, etc. The ISP post processor 906 can output or provide video data or multiple full frames for a video file, according to some embodiments.

Referring particularly to FIG. 10, the system 1000 includes a VIO 1012, an IMU 1010, a depth sensor 1016, processing circuitry 1008, a camera sensor 1002, an ISP 1004, an ISP post processor 1006, and a spatial audio source 1014. In some embodiments, the system 1000 is similar to the system 900 as described in greater detail above with reference to FIG. 9. For example, the processing circuitry 1008 can be the same as or similar to the processing circuitry 908, the IMU 1010 can be the same as or similar to the IMU 910, the VIO 1012 can be the same as or similar to the VIO 912, the camera sensor 1002 can be the same as or similar to the camera sensor 902, the ISP 1004 can be the same as or similar to the ISP 904, and the ISP post processor 1006 can be the same as or similar to the ISP post processor 906. In some embodiments, the spatial audio source 1014 is a spatial audio sensor, a microphone, etc., that is arranged or disposed on the wearable glasses on which the IMU 1010, the VIO 1012, the processing circuitry 1008, the camera sensor 1002, or the ISP 1004 are disposed. In some embodiments, the spatial audio source 1014 is the same as or similar to the spatial audio device 112. In some embodiments, the processing circuitry 1008 is also configured to use audio data or spatial audio data obtained from the spatial audio source 1014 to perform the motion estimation and/or image segmentation (e.g., as described in greater detail below with reference to FIG. 14, and in greater detail above with reference to FIGS. 1 and 8). In some embodiments, the depth sensor 1016 is a TOF camera, a LIDAR sensor, an ultrasound or ultrasonic depth sensor, an UWB depth sensor, etc., and is configured to provide depth data to the processing circuitry 1008.

Referring to FIGS. 1 and 9-10, the region generator 120 may generate the different regions based on eye tracking data obtained from sensors 104a . . . n, according to some embodiments. In some embodiments, a region with a higher frame rate (e.g., a high FPS region) is defined or generated and tracks a user's gaze direction so that the region with the higher frame rate is centered at the user's gaze direction. In some embodiments, the region with the higher frame rate is updated or re-defined in real-time to track the user's gaze direction. Areas of a field of view other than the user's gaze direction can be defined as regions with lower frame rates. The processing circuitry 116 can use any of the techniques described herein with the higher frame rate regions and lower frame rate regions that are defined based on the eye tracking data so that the higher frame rate region tracks the user's gaze direction.

Referring still to FIGS. 1 and 9-10, the region generator 120 may generate static regions, according to some embodiments. For example, a region with a higher frame rate may be a static or stationary region that is a center of a field of view of the user, while areas in peripheral view of the user are regions with lower frame rates. For example, a certain percentage of the field of view of the camera 114 may be the region with the higher frame rate, while other areas are the regions with the lower frame rate. The processing circuitry 116 can be configured to perform any of the techniques described herein for video capture based on predefined regions that are static, according to some embodiments.

Processes

Referring generally to FIGS. 11-15, different processes for performing any of the techniques described herein are shown. Process 1100 illustrates techniques for image segmentation and frame capture based on detected motion in image data, according to some embodiments. Process 1200 illustrates techniques for image segmentation and frame capture based on head motion to capture new image data and re-use overlapping image data, according to some embodiments. Process 1300 illustrates techniques for image segmentation and frame capture based on depth estimation, according to some embodiments. Process 1400 illustrates techniques for image segmentation and frame capture based on spatial audio sources, according to some embodiments. Process 1500 illustrates techniques for image segmentation and frame capture based on object or subject detection, according to some embodiments.

Figure 11:
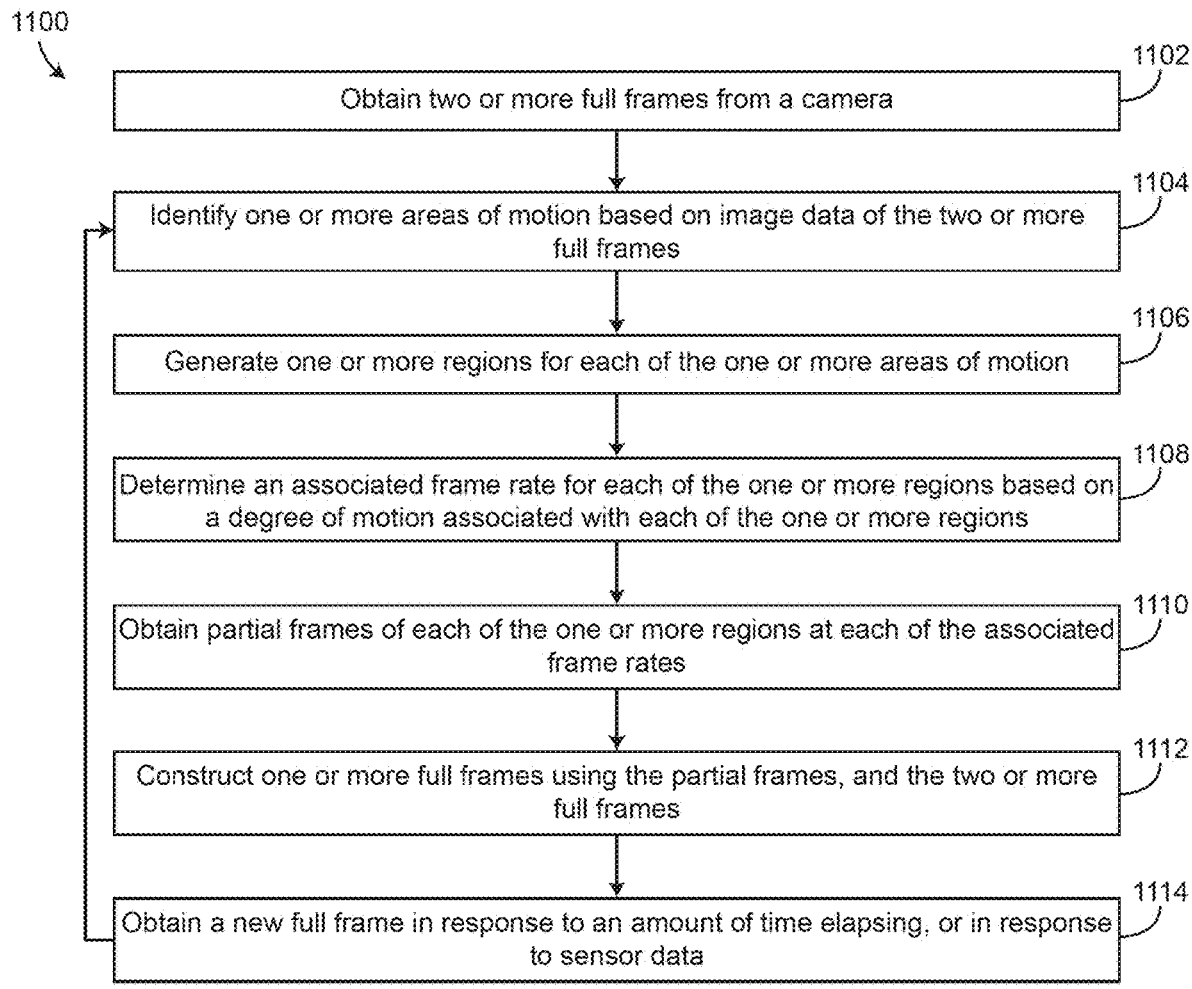
FIG. 11 is a flow diagram of a process for segmenting a field of view of a camera into different regions and capturing partial frames of the different regions at different frame rates and/or image resolutions based on detected motion in the field of view, according to some embodiments.

Referring particularly to FIG. 11, process 1100 for performing image segmentation and frame capture based on detected motion or areas of motion in a field of view of a camera is shown, according to some embodiments. Process 1100 includes steps 1102-1114 and can be performed by the image processing system 100 using any of the techniques as described in greater detail above with reference to FIGS. 1-4.

Process 1100 includes obtaining two or more frames (e.g., full frames) from a camera (step 1102), according to some embodiments. In some embodiments, the two or more frames are full frames or anchor frames. In some embodiments, the two or more frames are captured at a first, initial, or predetermined frame rate and/or a first, initial, or predetermined image quality or resolution. For example, the two or more frames can be captured at a frame rate of 24 FPS, 30 FPS, 60 FPS, etc. Step 1102 can be performed by a camera, sensor, lens, etc., of a head wearable device, an AR device, AR glasses, VR glasses, etc. In some embodiments, step 1102 is performed by processing circuitry 116 and camera 114 of the image processing system 100.

Process 1100 includes identifying one or more areas of motion based on image data of the two or more frames (step 1104), according to some embodiments. In some embodiments, only two frames are captured in step 1102 and the two frames are compared to each other to identify the one or more areas of motion. In some embodiments, multiple frames are captured at the predetermined frame rate and/or predetermined image capture resolution in step 1102, and two of the frames are selected and used in step 1104. In some embodiments, step 1104 is performed by the image analysis manager 118 of the processing circuitry 116 of the image processing system 100. In some embodiments, step 1104 is performed based on frames captured in step 1102, and/or one or more frames constructed in step 1112. Step 1104 can include comparing image data of the two or more frames to each other to determine different areas or different levels of motion (e.g., a high motion area, a medium motion area, a low motion area, etc.). In some embodiments, step 1104 includes comparing imagery between different full frames to determine one or more motion vectors, and a magnitude of the motion vectors is used to determine different discrete areas of various discrete degrees of motion.

Process 1100 includes generating one or more regions for each of the one or more areas of motion (step 1106), according to some embodiments. In some embodiments, the one or more regions at least partially overlap, or are nested within each other. For example, a high motion region may be nested within a medium motion region. In some embodiments, step 1106 is performed by the region generator 120. Step 1106 can be performed by processing circuitry locally positioned at a head wearable device, or can be performed remotely. In some embodiments, the regions generated in step 1106 encompass, surround, etc., the one or more areas of motion identified in step 1104. For example, step 1106 can include generating or defining a high motion region, a medium motion region, and a low motion region, according to some embodiments. In some embodiments, step 1106 includes defining or generating more than or less than three regions (e.g., based on the results of step 1104).

Process 1100 includes determining an associated frame rate (and/or an associated image capture resolution) for each of the one or more regions based on a degree of motion associated with each of the one or more regions (step 1108), according to some embodiments. In some embodiments, the associated frame rates and/or associated image capture resolutions are different based on the degree of motion associated with each of the one or more regions. In some embodiments, for example, a high motion region is assigned a highest frame rate (e.g., 60 FPS), while a medium motion region is assigned a lower frame rate (e.g., 30 FPS), and a low motion region is assigned a lowest frame rate (e.g., 15 FPS). In some embodiments, the frame rates are a portion of a desired overall frame rate for a final video file. In some embodiments, the frame rates and/or the image capture resolutions are determined based on the degree of motion associated with a corresponding region. For example, the degree of motion can be a quantifiable value that is used to determine the frame rate and/or the image quality for the corresponding region. In some embodiments, the frame rates and/or image capture resolutions are predetermined values that are selected based on a number of different regions, or a ranking of the regions. In some embodiments, step 1108 is performed by the region generator 120 (e.g., of the processing circuitry 116, or of processing circuitry of a remote device such as processing circuitry 1606).

Process 1100 includes obtaining partial frames of each of the one or more regions at each of the associated frame rates (and/or the associated image capture resolutions) (step 1110), according to some embodiments. For example, the high motion region may be captured as partial frames of the field of view of the camera at a highest frame rate (and/or a highest image capture resolution), while the medium motion region is captured as partial frames of the field of view of the camera at a medium frame rate (and/or a medium image capture resolution), and the low motion region is captured as partial frames (or full frames, depending on the definition of the low motion region) at a lowest frame rate (and/or a lowest image capture resolution). Step 1110 can be performed based on the frame rates and/or image capture resolutions determined in step 1108 for the one or more regions generated or defined in step 1106. In some embodiments, step 1110 is performed using the camera. In some embodiments, step 1110 is performed using the camera 114 of the image processing system 100. Step 1110 can be performed for a predetermined time period, until additional full frames or constructed frames are obtained for re-initiating step 1104, or until sensor data is obtained that indicates the regions should be adjusted or re-defined (e.g., when a sensor indicates head motion, in response to obtaining spatial audio, etc.). In some embodiments, step 1110 is performed by the region generator 120, the image signal processor 122, and the camera 114 of the image processing system 100.

Process 1100 includes constructing one or more frames using the partial frames, and optionally using the two or more frames (step 1112), according to some embodiments. In some embodiments, step 1112 is performed by the image signal post-processor 124 of the image processing system 100. For example, step 1112 may be performed on processing circuitry of a remote device (e.g., processing circuitry 1606 of the remote device 1604). In some embodiments, step 1112 includes performing an image analysis technique (e.g., identifying overlapping regions or similar image data of the partial frames obtained in step 1110) to stitch together, assemble, etc., the partial frames obtained in step 1110. In some embodiments, one or more of the partial frames obtained in step 1110 are re-used (e.g., partial frames obtained at a lower frame rate associated with a lower degree of motion) to perform step 1112. In some embodiments, step 1112 includes constructing full frames for a particular desired frame rate (e.g., 24 FPS, 30 FPS, 60 FPS, etc.) and/or a particular desired image resolution. In some embodiments, step 1112 includes performing image interpolation between partial frames obtained at a lower frame rate in step 1110.

Process 1100 includes obtaining a new full frame in response to an amount of time elapsing, or in response to sensor data (step 1114), according to some embodiments. In some embodiments, step 1114 is performed by the camera to obtain a full frame of the field of view of the camera. In some embodiments, step 1114 includes obtaining one of the constructed full frames resulting from performing step 1112. In some embodiments, step 1114 is performed prior to, after, or at least partially concurrently with step 1112. In some embodiments, in response to performing step 1114, process 1100 returns to step 1104. In some embodiments, the amount of time is a predetermined amount of time. In some embodiments, the sensor data is sensor data that indicates that the one or more regions generated or defined in step 1106 should be checked, adjusted, calibrated, re-generated, re-defined, etc.

Figure 12:
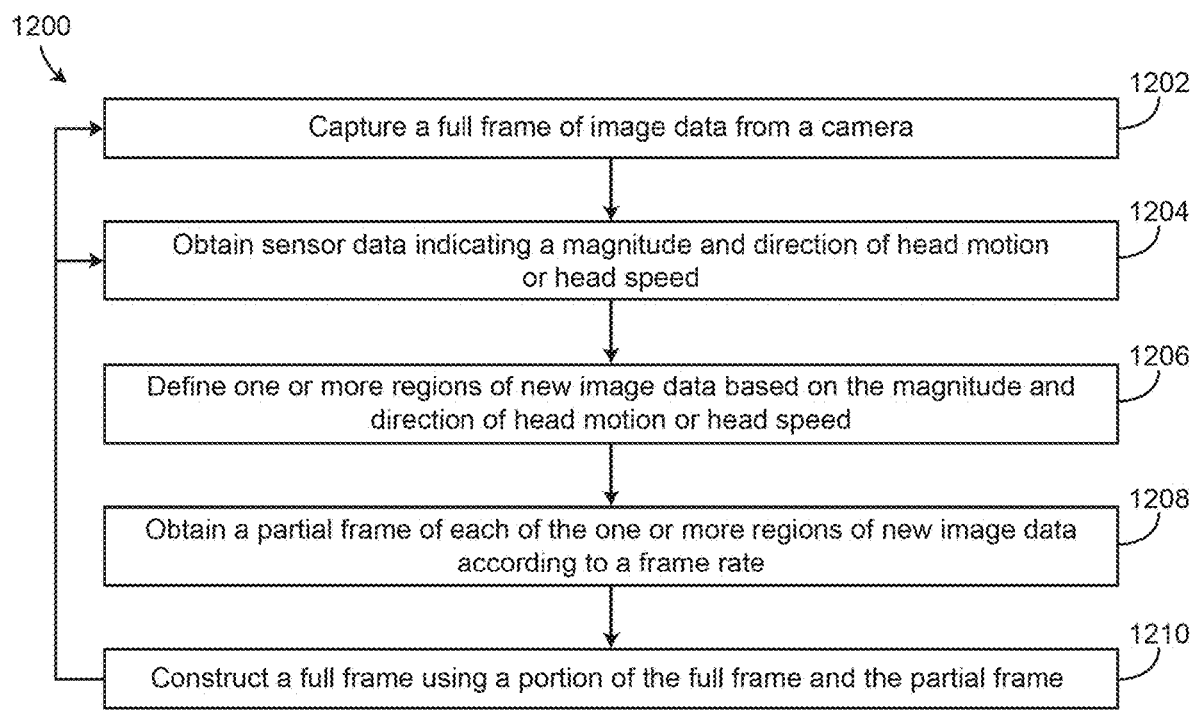
FIG. 12 is a flow diagram of a process for segmenting a field of view of a camera based on motion of a user's head with which the camera is coupled, and obtaining frames of the field of view, according to some embodiments.

Referring particularly to FIG. 12, process 1200 for image segmentation or region generation and frame capture based on head motion is shown, according to some embodiments. In some embodiments, process 1200 includes steps 1202-1210. In some embodiments, process 1200 is performed by the image processing system 100.

Process 1200 includes capturing a frame (e.g., a full frame) of image data from a camera (step 1202), according to some embodiments. In some embodiments, step 1202 is performed by the camera 114 of the image processing system 100. In some embodiments, step 1202 is performed prior to, after, or at least partially concurrently with step 1204. Step 1202 can include capturing a single full frame or multiple full frames, according to some embodiments.

Process 1200 includes obtaining sensor data indicating a magnitude and direction of head motion or head speed (step 1204), according to some embodiments. In some embodiments, step 1204 includes obtaining sensor data from one or more IMUs or VIO sensors (e.g., IMU/VIO 110). In some embodiments, the sensor data indicates the direction of head motion or head speed (e.g., if the IMUs or VIO sensors are coupled with the user's head such as on head wearable AR or VR glasses). In some embodiments, the sensor data also indicates the magnitude of head motion or head speed. In some embodiments, the sensor data is used to determine the magnitude and direction of the user's head motion or head speed. For example, the sensor data can be obtained over time to determine a time rate of change or derivative of the sensor data for determining speed or velocity of the head motion. In some embodiments, step 1204 is performed by the image analysis manager 118, or more generally, the processing circuitry 116 based on the motion data obtained from IMU/VIO 110.

Process 1200 includes defining one or more regions of new image data based on the magnitude and direction of head motion or head speed (step 1206), according to some embodiments. In some embodiments, step 1206 is performed by the region generator 120 of the processing circuitry 116. In some embodiments, step 1206 includes determining a size or dimensions of one or more regions of new image data. For example, the one or more regions of the new image data can be along a horizontal and/or vertical edge of a field of view of the camera. In some embodiments, a width of a region of new image data that is along a vertical or side edge of the field of view of the camera is based on an amplitude or amount of a horizontal component of the head motion or head speed. For example, if the user's head motion is in a rightwards direction at a high speed, a width of a region of new image data along a right edge of the field of view of the camera may be greater than a width of a region of new image data along the right edge of the field of view of the camera when the user's head is moving in the rightwards direction at a relatively slow speed. Similarly, the one or more regions can include regions or areas along horizontal or upper and lower edges of the field of view of the camera, with a height of the regions being proportional to a vertical component of speed of the user's head. In some embodiments, the one or more regions for new image data overlap with a region of previously captured image data (e.g., a portion of the full frame of image data as obtained in step 1202, or a portion of a constructed full frame as determined in step 1210). In some embodiments, the one or more regions of new image data are the new regions 602.

Process 1200 includes obtaining a partial frame of each of the one or more regions of new image data according to a frame rate (and/or an image capture quality) (step 1208), according to some embodiments. In some embodiments, step 1208 is performed by the image signal processor 122 and the camera 114, or the region generator 120 and the camera 114. In some embodiments, step 1208 includes determining the frame rate and/or the image capture resolution for each of the one or more regions based on the magnitude and direction of head motion or head speed. In some embodiments, the frame rate and/or the image capture resolution is proportional to the magnitude so that faster head motion results in the new regions being captured at a higher frame rate and/or a higher image capture resolution.

Process 1200 includes constructing a frame (e.g., a full frame) using a portion of the frame and the partial frame (step 1210), according to some embodiments. In some embodiments, step 1210 is performed by the image signal processor 122. In some embodiments, step 1210 includes identifying (e.g., using an image analysis or pattern recognition technique) one or more overlapping portions, areas, pixels, image regions, image data, imagery, etc., of the partial frames of the one or more regions of new image data and the frame or a previously constructed full frame, and stitching together partial and frames (e.g., using a portion of full frames) to construct the frame (e.g., the full frame) in step 1210. In some embodiments, step 1210 includes constructing multiple frames (e.g., full frames) using multiple partial frames and multiple frames. In some embodiments, one or more of the frames, and/or one or more of the partial frames are re-used to construct multiple frames (e.g., full frames) according to a frame rate and/or an image capture resolution. In response to performing step 1210, process 1200 can return to step 1202 if a new frame (e.g., a new full frame) should be captured, or may return to step 1204 if the frame (e.g., the full frame) constructed in step 1210 can be subsequently used, without requiring obtaining a new frame (e.g., a new full frame).

Figure 13:
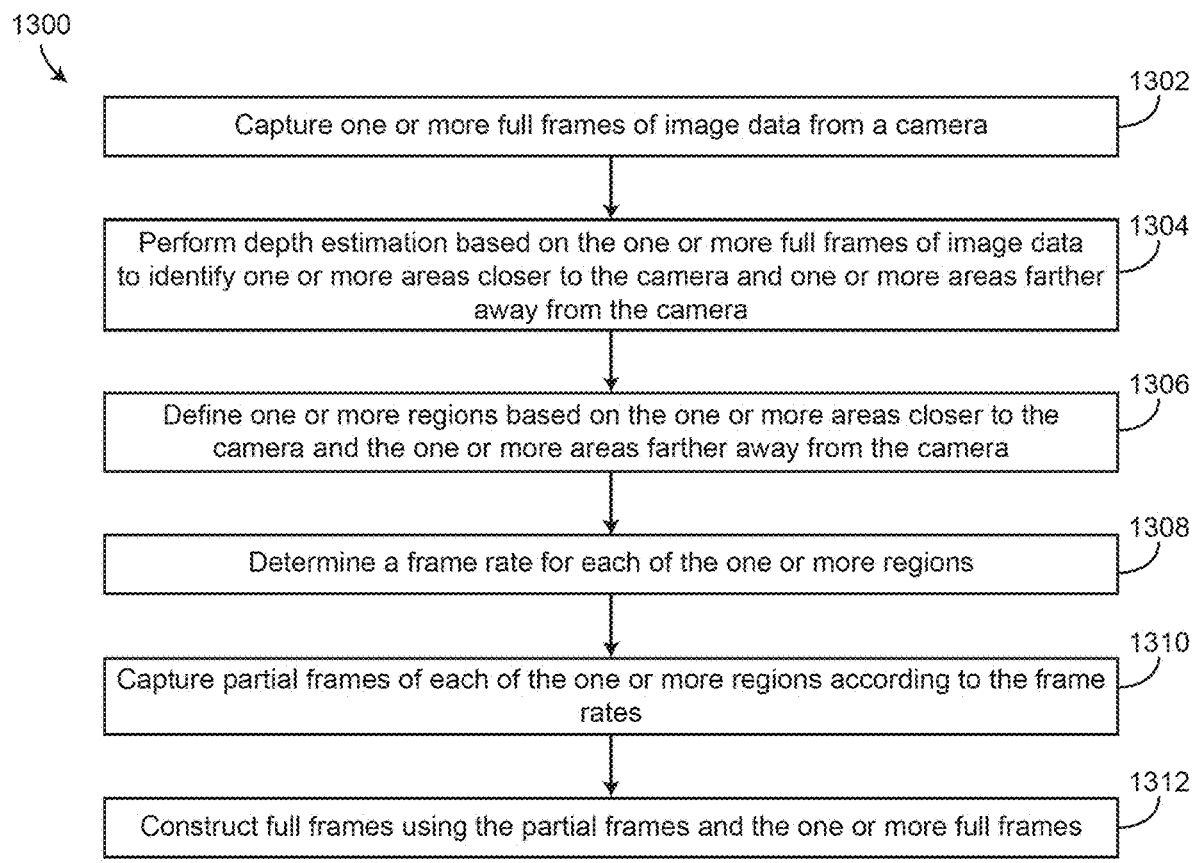
FIG. 13 is a flow diagram of a process for region generation of a field of view of a camera and operation of the camera based on depth estimation of an environment of a field of view of the camera, according to some embodiments.

Referring particularly to FIG. 13, a process 1300 for image segmentation or region generation and frame capture based on depth estimation is shown, according to some embodiments. In some embodiments, steps 1302-1312 includes steps 1302-1312. In some embodiments, step 1300 is performed by the image processing system 100.

Process 1300 includes capturing one or more full frames of image data from a camera (step 1302), according to some embodiments. In some embodiments, step 1302 is the same as or similar to step 1202 of process 1200. In some embodiments, step 1302 is the same as or similar to step 1102 of process 1100.

Process 1300 includes performing depth estimation based on the one or more frames of image data (or on data received from a depth sensor such as depth sensor 1016) to identify one or more areas closer to the camera and one or more areas farther away from the camera (step 1304), according to some embodiments. In some embodiments, step 1304 is performed by the image analysis manager 118 of processing circuitry 116. In some embodiments, step 1304 includes generating multiple motion vectors based on image data of the one or more frames. In some embodiments, the multiple motion vectors can be used to identify different regions that have changing imagery at a faster pace than other regions (e.g., foreground and background regions). In some embodiments, step 1304 is performed to identify image data associated the first region 704 and the second region 706 (e.g., shown in FIG. 7).

Process 1300 includes defining one or more regions based on the one or more areas that are closer to the camera and the one or more areas that are farther away from the camera (step 1306), according to some embodiments. In some embodiments, step 1306 includes generating or defining regions 704 and 706. In some embodiments, the one or more regions that are based on the one or more areas closer to the camera are assigned a higher frame rate and/or a higher image capture resolution than the one or more regions of the one or more areas that are farther away from the camera. In some embodiments, step 1306 is performed by the region generator 120.

Process 1300 includes determining a frame rate (and/or an image capture resolution) for each of the one or more regions (step 1308), according to some embodiments. In some embodiments, step 1308 is performed by the region generator 120. In some embodiments, step 1308 is performed by the region generator 120. In some embodiments, the frame rates and/or image captures resolutions are assigned or determined based on how close the image data of each of the one or more regions are relative to the camera. For example, a region for image data or imagery that is farther away from a region for image data or imagery that is closer to the camera may have a lower relative frame rate and/or a lower relative image capture resolution.

Process 1300 includes capturing partial frames of each of the one or more regions according to the frame rates (and/or image capture qualities) (step 1310), according to some embodiments. In some embodiments, step 1310 is performed by the image signal processor 122 or the region generator 120 and the camera 114 of image processing system 100. In some embodiments, step 1310 includes operating the camera to capture the partial frames of each of the one or more regions according to the frame rates (and/or image capture qualities) determined in step 1308.

Process 1300 includes constructing frames using the partial frames and the one or more frames (step 1312), according to some embodiments. In some embodiments, step 1312 is performed by the image signal processor 122. In some embodiments, step 1312 includes identifying one or more overlapping or common regions of the one or more partial frames, and constructing the frames (e.g., full frames) using the partial frames and the one or more frames.

Figure 14:
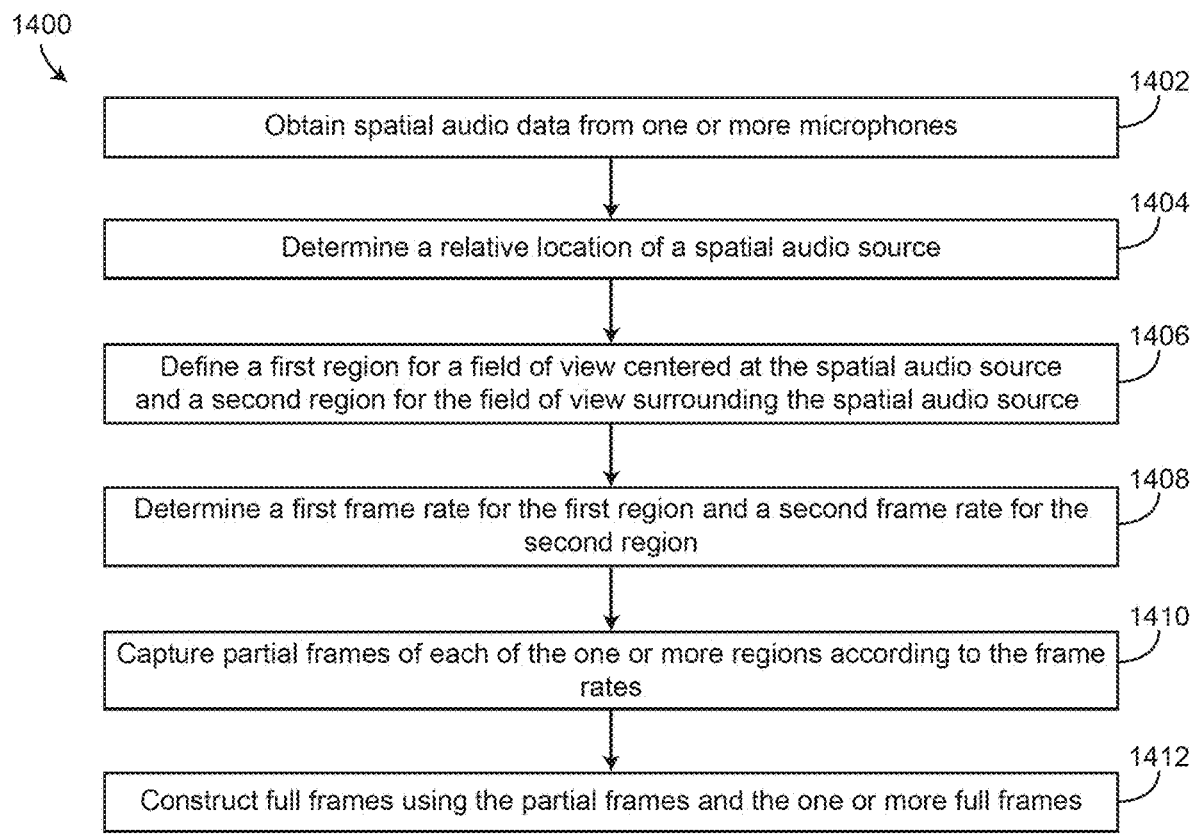
FIG. 14 is a flow diagram of a process for region generation of a field of view of a camera and operation of the camera based on locations of one or more spatial audio sources, according to some embodiments.

Referring particularly to FIG. 14, process 1400 for performing image segmentation and capture based on spatial audio is shown, according to some embodiments. In some embodiments, process 1400 includes steps 1402-1412 and is performed by the image processing system 100. Process 1400 can be performed to facilitate identification of objects, individuals, sound sources, etc., that may be of significance and thereby sampled at a higher frame rate and/or a higher image capture resolution than other areas in a field of view of a camera which do not generate sound, and can thereby be sampled at a lower frame rate and/or image capture resolution.

Process 1400 includes obtaining spatial audio data from one or more microphones (step 1402), according to some embodiments. In some embodiments, step 1402 is performed by the image processing system 100, or more specifically, by the image analysis manager 118 and the spatial audio devices 112. In some embodiments, the one or more microphones are the spatial audio devices 112. In some embodiments, the one or more microphones include an array of microphones that are positioned along a frame, structural member, etc., of head wearable glasses or goggles.

Process 1400 includes determining a relative location of a spatial audio source (step 1404), according to some embodiments. In some embodiments, step 1404 is performed by the image analysis manager 118. In some embodiments, step 1404 includes determining a relative location or distance between the one or more microphones (e.g., the head wearable glasses or goggles) and the spatial audio source. In some embodiments, step 1404 includes performing a triangulation technique to determine a particular position within a field of view of a camera (e.g., of the head wearable glasses or goggles) of the spatial audio source.

Process 1400 includes defining a first region for a field of view centered at the spatial audio source and a second region for the field of view surrounding the spatial audio source (step 1406), according to some embodiments. In some embodiments, step 1406 is performed by the region generator 120. In some embodiments, step 1406 includes defining the first region 816*a* and the second region 816*b* as shown in FIG. 8. In some embodiments, the spatial audio source can be an individual or a speaker, or other area, object, etc., of interest. In some embodiments, the first region is nested within the second region. In some embodiments, the regions are areas of a field of view of the camera. In some embodiments, step 1406 includes defining a third region that includes an entirety of the field of view of the camera. In some embodiments, the first region is centered at the spatial audio source within the field of view of the camera.

Process 1400 includes determining a first frame rate (and/or a first image capture resolution) for the first region and a second frame rate (and/or a second image capture resolution) for the second region (step 1408), according to some embodiments. In some embodiments, step 1408 also includes determining a third frame rate (and/or a third image capture resolution) for the third region (e.g., a frame rate for a capture of the entire area of the field of view of the camera). In some embodiments, the frame rate for the first region is higher than the frame rate for the second region. Similarly, the image capture resolution for the first region may be higher than the image capture resolution for the second region. In some embodiments, for example, if the first region surrounds or covers a person's face, the frame rate for the first region can be greater than the frame rate for the second region to facilitate obtaining additional frames of the person's face and facial features. For similar reasons, the image capture resolution of the first region can be greater than the image capture resolution of the second region to facilitate capturing facial features at a higher resolution. In some embodiments, the frame rate (and/or the image capture quality) of the third region is lower than the frame rate (and/or the image capture qualities) of the first and second regions.

Process 1400 includes capturing partial frames of each of the one or more regions according to the frame rates (and/or the image capture qualities) (step 1410), according to some embodiments. In some embodiments, the first region is nested within the second region, and both the first and second region are nested within the third region. In some embodiments, the partial frames of the different regions are captured by the camera 114 according to the frame rates (and/or image capture qualities) determined in step 1408.

Process 1400 includes constructing frames (e.g., full frames) using the partial frames, and the one or more frames (step 1412), according to some embodiments. In some embodiments, step 1412 is performed by the image signal processor 122 and/or the ISP post-processor 124. In some embodiments, step 1412 includes identifying one or more regions, areas, imagery, pixels, image data, etc., of the partial frames that overlap and constructing the frames (e.g., the full frames) based on the partial frames. In some embodiments, image data of the partial frames that are obtained at a slower frame rate are used multiple times, or interpolated to obtain intermediate frames. In some embodiments, the frames (e.g., full frames) are constructed to generate a video file having a particular frame rate and/or a particular overall image resolution.

Figure 15:
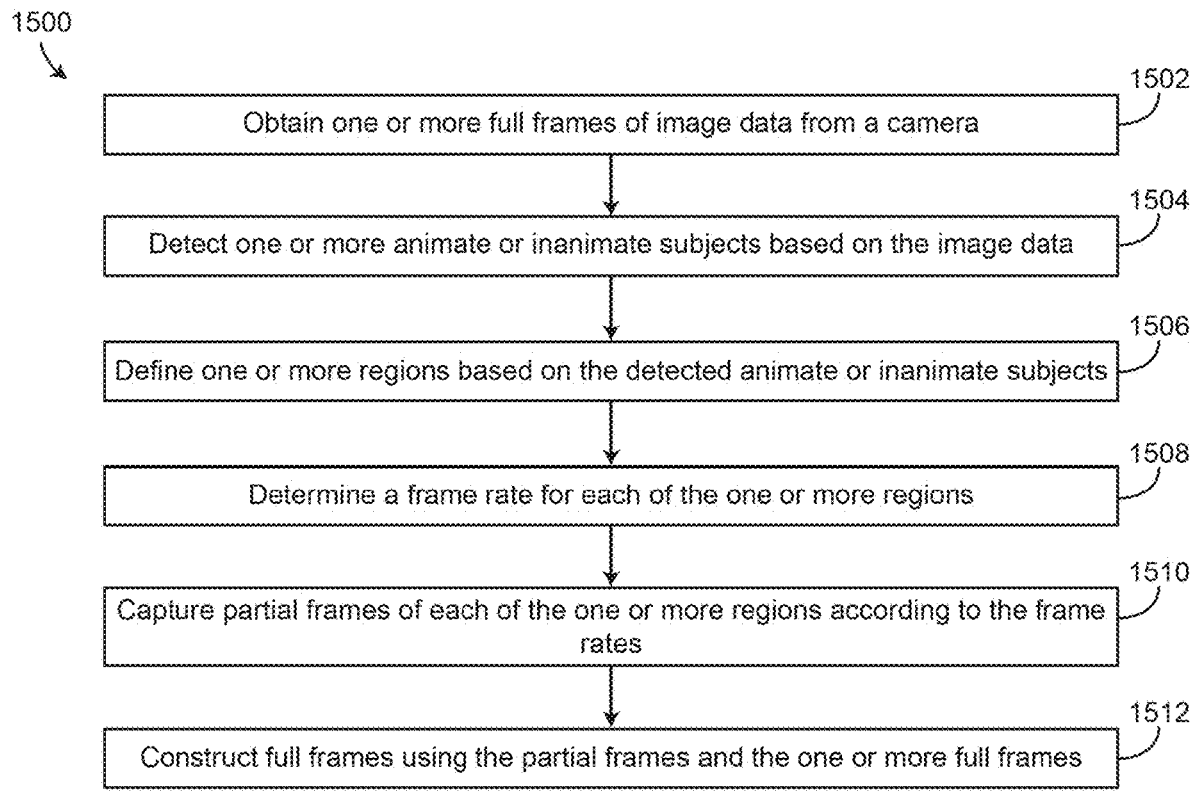
FIG. 15 is a flow diagram of a process for region generation of a field of view of a camera and operation of the camera based on subject or object detection, according to some embodiments.

Referring particularly to FIG. 15, process 1500 for performing image segmentation and frame capture based on an image analysis, object detection, or neural network technique is shown according to some embodiments. Process 1500 can include steps 1502-1512 and can be performed by the image processing system 100, according to some embodiments. In some embodiments, process 1500 can be implemented using an object detection or object recognition technique. It should be understood that while process 1500 and process 1400 are shown in FIGS. 14 and 15 as separate processes, techniques of both may be implemented by the image processing system 100 for image segmentation and capture.

Process 1500 includes obtaining one or more full frames of image data from a camera (step 1502), according to some embodiments. In some embodiments, step 1502 is performed by the processing circuitry 116 of the image analysis system 100 and the camera 114. Step 1502 can be the same as or similar to step 1302 of process 1300, step 1202 of process 1200, or step 1102 of process 1100, according to some embodiments.

Process 1500 includes detecting one or more animate or inanimate subjects based on the image data (step 1504), according to some embodiments. In some embodiments, step 1504 includes detecting animate or inanimate subjects such as people, faces, animals, furniture, plants, vehicles, objects, etc. In some embodiments, step 1504 includes determining if the detection results are animate or inanimate objects. For example, it may be desirable to obtain image data at a higher frame rate and/or a higher image capture resolution of an animate subject such as a dog, a cat, a person, etc., and obtain image data at a lower frame rate and/or a lower image capture resolution of an inanimate subject such as a couch, a chair, a table, etc. In some embodiments, step 1504 is performed by the image signal processor 122 based on the one or more frames (e.g., full frames) or image data of the one or more frames obtained in step 1502. In some embodiments, step 1504 is performed remotely or locally at a head wearable device of the image processing system that implements process 1500.

Process 1500 includes defining one or more regions based on the detected animate or inanimate subjects (step 1506), according to some embodiments. In some embodiments, step 1506 is performed by the region generator 120 of the image processing system 100. Step 1506 can be performed based on the results of step 1504. In some embodiments, the one or more regions are defined or generated for animate objects. For example, if the results of step 1504 indicate that there are multiple animate subjects or objects (e.g., people, animal, moving vehicles, etc.), the one or more regions can be generated for the different animate subjects or objects. In some embodiments, each of the one or more regions is associated with a different object or animate subject detected in step 1504.

Process 1500 includes determining a frame rate (and/or a first image capture resolution) for each of the one or more regions (step 1508), according to some embodiments. In some embodiments, step 1508 includes determining a frame rate and/or an image capture resolution for each of the one or more regions based on the results of step 1504. For example, regions that are associated with animate objects or subjects may be assigned a higher frame rate and/or image capture resolutions than regions that are associated with inanimate objects or subjects. In some embodiments, a detected face may have a generated and associated region with a higher frame rate and/or a higher image capture resolution than a region associated with an inanimate or surrounding object. In some embodiments, step 1508 is performed by the region generator 120 of the image processing system 100.

Process 1500 includes capturing partial frames of each of the one or more regions according to the frame rates and/or image capture resolutions (e.g., as determined in step 1508) (step 1510), according to some embodiments. In some embodiments, step 1510 is performed by the image signal processor 122, or the region generator 120, and the camera 114.

Process 1500 includes constructing frames (e.g., full frames) using the partial frames and the one or more frames (step 1512), according to some embodiments. In some embodiments, step 1512 is performed by the image signal processor 122. Step 1512 can be performed by identifying one or regions or areas of image data that overlap and constructing frames (e.g., full frames) using the partial frames obtained in step 1510. In some embodiments, step 1512 is the same as or similar to step 1412 of process 1400, step 1312 of process 1300, step 1210 of process 1200, or step 1114 of process 1100.

Power Consumption Advantages

Referring to FIGS. 1, 9-10, and 16, the ISP of a head wearable system may consume the most electrical energy (e.g., from the battery 126) to perform its functionality (e.g., using sensor data from camera sensors or lenses to construct full or partial frames). Additionally, the ISP (e.g., ISP 122, ISP 904, ISP 1004, etc.) may consume additional electrical energy when the camera (e.g., the camera 114) captures higher resolution image data and/or when the camera captures image data at a higher frame rate. In some embodiments, the systems and methods described in greater detail above with reference to FIGS. 1-15 facilitate reducing a power consumption of the ISP and the camera (e.g., the ISP 122 and the camera 114 of the image processing system 100) by determining different areas of interest and determining appropriate image capture resolutions and corresponding frame rates. For example, power can be conserved by obtaining image data of a subject's face at a higher image resolution and lower frame rate, and obtaining image data of surrounding areas at a lower image resolution and lower frame rate. FIGS. 2-8 and the associated descriptions illustrate different techniques for ROI generation (e.g., image segmentation).

In some embodiments, power consumed by the ISP 122 (e.g., and the camera 114) is reduced by a factor P $F_{red}$ by implementing the techniques described herein. The factor P $F_{red}$ may be defined as:

$$PF_{red} = \frac{\sum_{i=1}^{N}\left(\frac{FR_{ROI}(i)Res_{ROI}(i)}{N}\right)}{FR_{nom}Res_{nom}}$$

where $PF_{red}$ is the factor of power reduction, N is a number of ROIs, $FR_{ROI}(i)$ is a frame rate of an ith ROI, $Res_{ROI}(i)$ is image capture resolution of the ith ROI, $FR_{nom}$ is a nominal or baseline frame rate (e.g., a frame rate at which the ISP 122 and the camera 114 would capture frames without implementing the techniques described herein), and $Res_{nom}$ is nominal resolution (e.g., an image resolution at which the ISP 122 and the camera 114 would capture image data without implementing the techniques described herein). Advantageously, implementing the systems and methods described herein may significantly reduce an amount of power consumed from the battery 126. Advantageously, reducing power consumption can also reduce heat generation and improve heat dissipation of the image processing system 100 (e.g., as implemented on a head wearable device as shown in FIG. 16). Reducing power consumption can also facilitate an improved battery life, and reduce degradation of the battery 126.

Power consumption and thereby heat dissipation can also be improved for the HWD 1602 by remote performance of the region generator 120 and/or the image analysis manager 118 on remote processing circuitry. For example, as described in greater detail above with reference to FIG. 16, the remote device 1604 can implement the various ROI generation, image segmentation, frame rate determination, etc., techniques. The processing circuitry 116 of the HWD 1602 can then perform the reduced power consumption image capture and ISP functionality described herein.

Audio and Visual Cues

Referring again to FIGS. 1 and 16, the image processing system 100 can include one or more aural alert devices 128 and one or more visual alert devices 130, according to some embodiments. In some embodiments, the one or more aural alert devices 128 are speakers, headphones, etc., that are physically coupled with the HWD 1602, or a structural member thereof, and are operable to provide sounds, aural notifications, etc., to a user. Similarly, the one or more visual alert devices 130 are LEDs, display screens, etc., that are physically coupled with the HWD 1602 or a structural member thereof, according to some embodiments. In some embodiments, the processing circuitry 116 is configured to operate the aural alert devices 128 and/or the visual alert devices 130 to provide aural and/or visual cues to a wearer or user of the HWD 1602. In some embodiments, the visual alert devices 130 are positioned about a frame or periphery of glasses or a lens (e.g., an AR combiner, lens, etc.) of the HWD 1602 through which the user or wearer views imagery and/or an external environment. In some embodiments, the processing circuitry 116 is configured to operate the aural alert devices 128 and/or the visual alert devices 130 based on the ROIs defined using any of the techniques described herein (e.g., environmental motion as described in greater detail above with reference to FIGS. 1 and 2-4, head motion as described in greater detail above with reference to FIGS. 1 and 5-6, depth estimation as described in greater detail above with reference to FIGS. 1 and 7, spatial audio and/or object detection as described in greater detail above with reference to FIGS. 1 and 8, or any combination thereof).

Other smart glasses, AR glasses, etc., do not have a head-up display to indicate a field of view of a camera to the user. Accordingly, the users may not have a strong sense of whether a subject of a video or photo for capture is positioned correctly within the field of view.

In some embodiments, the processing circuitry 116 is configured to track a position of one or more of the ROIs over time (e.g., relative to a border or edge of the field of view of the camera 114), and operate the aural alert devices 128 and/or the visual alert devices 130 in response to the ROI moving out of the field of view of the camera 114. The processing circuitry 116 can operate the aural alert devices 128 to provide an aural notification (e.g., words such as "left" or "right" or "up" or "down") to the user to inform the user when the ROI moves out of the field of view of the camera, and along which edge or border of the field of view the ROI is at. In some embodiments, the processing circuitry 116 can operate the visual alert devices 130 (e.g., the LEDs) to actuate, provide a different colored light, provide a different intensity of light, or any combination thereof, to indicate to the user a particular location along a perimeter of the field of view that the ROI is proximate. In this way, the user can be trained over time to learn where the different boundaries or edges of the field of view of the camera 114 lie. In some embodiments, the user's field of view may be different than the field of view of the camera 114. In this way, the processing circuitry 116 can operate aural alert devices 128 and/or visual alert devices 130 to provide aural and/or visual notification of peripheries of the field of view of the camera 114.

Additionally, the visual and/or aural cues may prompt the user to move their head to follow a ROI. For example, if the ROI is associated with a subject's face, the visual and/or aural cues (through operation of the aural alert devices 128 and/or the visual alert devices 130) may notify the user when the ROI is leaving the field of view of the camera 114, as well as which direction along the periphery of the field of view of the camera 114 the ROI is proximate, thereby prompting the user to move their head to keep the ROI (or the subject's face) within the field of view of the camera 114. The visual and/or aural cues can also provide visual and/or aural cues to the user when a subject is centered in the field of view of the camera 114. For example, when a ROI associated with a subject's face is centered in the field of view of the camera 114, the one or more visual alert devices 130 may change color (e.g., emit a green colored light), intensity, actuation, etc., to visually notify the user that the subject's face is centered in the field of view. In some embodiments, the processing circuitry 116 is configured to obtain eye tracking data from an eye tracker and operate the one or more aural alert devices 128 and/or the one or more visual alert devices 130 (according to any of the controls described herein) to aurally or visually notify the user regarding a current gaze direction relative to a center, peripheries, or edges of the field of view of the camera 114.

Configuration of Exemplary Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method for obtaining a plurality of frames of image data, the method comprising:
    obtaining a first frame and a second frame of image data of a field of view from a camera sensor;
    defining one or more regions of the field of view based on a degree of motion detected in a plurality of areas of the field of view using the first frame and the second frame of image data;
    determining a frame rate for each of the one or more regions based on the degree of motion detected in the plurality of areas of the field of view; and
    obtaining a plurality of partial frames of image data by obtaining image data of the one or more regions of the field of view according to the frame rate.

2. The method of claim 1, wherein the first frame and the second frame are full frames of an entirety of the field of view, wherein obtaining the first frame of image data comprises obtaining two or more frames of image data, and defining the one or more regions of the field of view comprises:
    comparing the two or more frames to each other to identify a plurality of areas of motion; and
    defining a plurality regions, each region associated with a different one of the plurality of areas of motion.

3. The method of claim 2, wherein the plurality of areas of motion comprise at least a first area and a second area, wherein an amount of motion present at the first area is greater than an amount of motion present at the second area.

4. The method of claim 1, wherein obtaining the plurality of partial frames of the image data comprises one of:
    operating the camera sensor to obtain the plurality of partial frames of image data according to at least one of the frame rate and the image capture resolution; or
    operating the camera sensor to obtain a plurality of full frames at a full resolution and a maximum frame rate, and obtaining the plurality of partial frames of image data according to at least one of the frame rate and the image capture resolution based on the plurality of full frames using an image signal processor or a sensor readout circuit.

5. The method of claim 1, wherein defining the one or more regions of the field of view further comprises:
    performing depth estimation to identify at least a foreground and a background of an environment; and
    defining a first region associated with the foreground and a second region associated with the background.

6. The method of claim 5, wherein the frame rate for the first region is greater than the frame rate for the second region.

7. The method of claim 1, wherein defining the one or more regions of the field of view comprises:
    detecting one or more objects in the field of view based on the frame of image data; and
    defining a region for each of the one or more objects in the field of view.

8. The method of claim 1, further comprising:
    obtaining sensor data indicating a direction and magnitude of motion of a user's head; and
    defining the one or more regions at least partially based on at least one of the direction or magnitude of motion of the user's head.

9. The method of claim 1, further comprising constructing one or more frames using the plurality of partial frames of image data.

10. A system comprising:
    a head wearable display comprising a camera sensor, and at least one of an inertial measurement unit (IMU), a visual inertial odometry (VIO) sensor, or a depth sensor; and
    processing circuitry configured to:
        obtain a first frame of image data of a field of view from the camera sensor;
        define one or more regions of the field of view using the first frame of image data based on feedback from the IMU, the VIO sensor, or the depth sensor;
        determine at least one of a frame rate and an image capture resolution for each of the one or more regions based on the feedback from the IMU, the VIO sensor, or the depth sensor; and
        operate the camera sensor to obtain a plurality of partial frames of image data by obtaining image data of the one or more regions of the field of view according to at least one of the frame rate and the image capture resolution.

11. The system of claim 10, wherein the processing circuitry comprises both local processing circuitry positioned at the head wearable display, and remote processing circuitry positioned remotely from the head wearable display.

12. The system of claim 11, wherein the remote processing circuitry is a processing circuitry of a user's personal computing device.

13. The system of claim 10, wherein the head wearable display further comprises a battery, the battery configured to provide electrical power to any of the processing circuitry, the camera sensor, the IMU, or the VIO sensor, wherein defining the one or more regions, determining the at least one of the frame rate or the image capture resolution, and operating the camera sensor to obtain the plurality of partial frames reduces power consumption from the battery by a factor.

14. The system of claim 13, wherein the factor is a function of a number of the one or more regions, frame rates of each of the one or more regions, resolutions of each of the one or more regions, a nominal frame rate, and a nominal resolution.

15. The system of claim 10, further comprising at least one of a plurality of light emitting diodes (LEDs) or a speaker, wherein the processing circuitry is configured to:
- track a relative position of one of the one or more regions relative to a periphery of the field of view of the camera sensor; and
- operate at least one of the plurality of LEDs or the speaker in response to the one of the one or more regions approaching the periphery of the field of view of the camera sensor to inform the user regarding the periphery of the field of view of the camera sensor.

16. The system of claim 15, wherein the plurality of LEDs are positioned along a frame of the head wearable display.

17. A method for obtaining a plurality of frames of image data, the method comprising:
- obtaining spatial audio from a spatial audio sensor and feedback from at least one of an inertial measurement unit (IMU), a visual inertial odometry (VIO) sensor, or a depth sensor;
- defining one or more regions of a field of view of a camera sensor based on the spatial audio and the feedback;
- determining a frame rate for each of the one or more regions of the field of view of the camera sensor based on at least one of the spatial audio or the feedback; and
- operating the camera sensor to obtain partial frames of each of the one or more regions according to the frame rate for each of the one or more regions.

18. The method of claim 17, further comprising constructing one or more frames using the partial frames of image data.

19. The method of claim 17, wherein the spatial audio sensor comprises an array of microphones.

20. The method of claim 17, wherein at least one of the one or more regions are centered at a spatial audio source.

* * * * *